(12) United States Patent
Sharma et al.

(10) Patent No.: US 11,942,983 B2
(45) Date of Patent: Mar. 26, 2024

(54) NARROW BANDWIDTH PART HOPPING PATTERN

(71) Applicant: QUALCOMM Incorporated, San Diego, CA (US)

(72) Inventors: Prashant Sharma, San Jose, CA (US); Changhwan Park, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/411,737

(22) Filed: Aug. 25, 2021

(65) Prior Publication Data
US 2023/0068012 A1   Mar. 2, 2023

(51) Int. Cl.
*H04B 1/713* (2011.01)
*H04B 1/7143* (2011.01)
(Continued)

(52) U.S. Cl.
CPC ........... *H04B 1/713* (2013.01); *H04B 1/7143* (2013.01); *H04L 5/0012* (2013.01);
(Continued)

(58) Field of Classification Search
None
See application file for complete search history.

(56) References Cited

U.S. PATENT DOCUMENTS

2015/0288490 A1* 10/2015 Sun .................... H04W 72/21
370/330
2019/0222256 A1* 7/2019 Nammi ................ H04L 5/006
(Continued)

FOREIGN PATENT DOCUMENTS

WO   WO-2019095834 A1 *  5/2019  ............. H04B 1/713
WO      2021142762 A1      7/2021
(Continued)

OTHER PUBLICATIONS

International Search Report and Written Opinion—PCT/US2022/073623—ISA/EPO—dated Oct. 20, 2022.
(Continued)

*Primary Examiner* — Jay L Vogel
(74) *Attorney, Agent, or Firm* — ArentFox Schiff LLP

(57) ABSTRACT

This disclosure provides systems, methods and apparatus, including computer programs encoded on computer storage media, for managing a bandwidth of a user equipment (UE). The UE has a narrower bandwidth part (NBWP) that follows a NBWP hopping pattern and allows the UE to hop frequency over time within a larger bandwidth. The UE receives a configuration of one or more NBWP hopping patterns for one or more configured NBWPs, each configured NBWP having a bandwidth less than or equal to a maximum configurable bandwidth of a bandwidth part. The UE determines an active NBWP hopping pattern for an active NBWP of the one or more configured NBWPs. The UE communicates on frequency domain resources for a frequency domain hop indicated by the active NBWP hopping pattern applied to the active NBWP. The UE may receive an indication of whether to switch the active NBWP hopping pattern.

27 Claims, 11 Drawing Sheets

(51) Int. Cl.
    *H04L 5/00*          (2006.01)
    *H04W 72/0453*    (2023.01)
    *H04W 72/23*      (2023.01)

(52) U.S. Cl.
    CPC ....... *H04L 5/0098* (2013.01); *H04W 72/0453* (2013.01); *H04W 72/23* (2023.01)

(56) References Cited

U.S. PATENT DOCUMENTS

| | | | |
|---|---|---|---|
| 2020/0007186 A1* | 1/2020 | Seller | H04B 1/7156 |
| 2020/0186188 A1* | 6/2020 | Li | H04W 72/0453 |
| 2020/0382157 A1* | 12/2020 | Bhamri | H04B 1/7156 |
| 2021/0258963 A1 | 8/2021 | Sakhnini et al. | |
| 2021/0360616 A1* | 11/2021 | Yi | H04L 5/0012 |

FOREIGN PATENT DOCUMENTS

| | | | | |
|---|---|---|---|---|
| WO | 2021147002 A1 | 7/2021 | | |
| WO | WO-2021146867 A1 * | 7/2021 | ............. | H04B 1/713 |

OTHER PUBLICATIONS

Qualcomm Incorporated: "BW Reduction for RedCap UE", R1-2104677, 3GPP TSG-RAN WG1 Meeting #105, 3rd Generation Partnership Project (3GPP), Mobile Competence Centre, 650, Route Des Lucioles, F-06921, Sophia-Antipolis Cedex, France, vol. RAN WG1, No. e-Meeting, May 10, 2021-May 27, 2021, May 12, 2021, XP052010928, 17 Pages, pp. 7-8, paragraph 3.2, figure 5.

\* cited by examiner

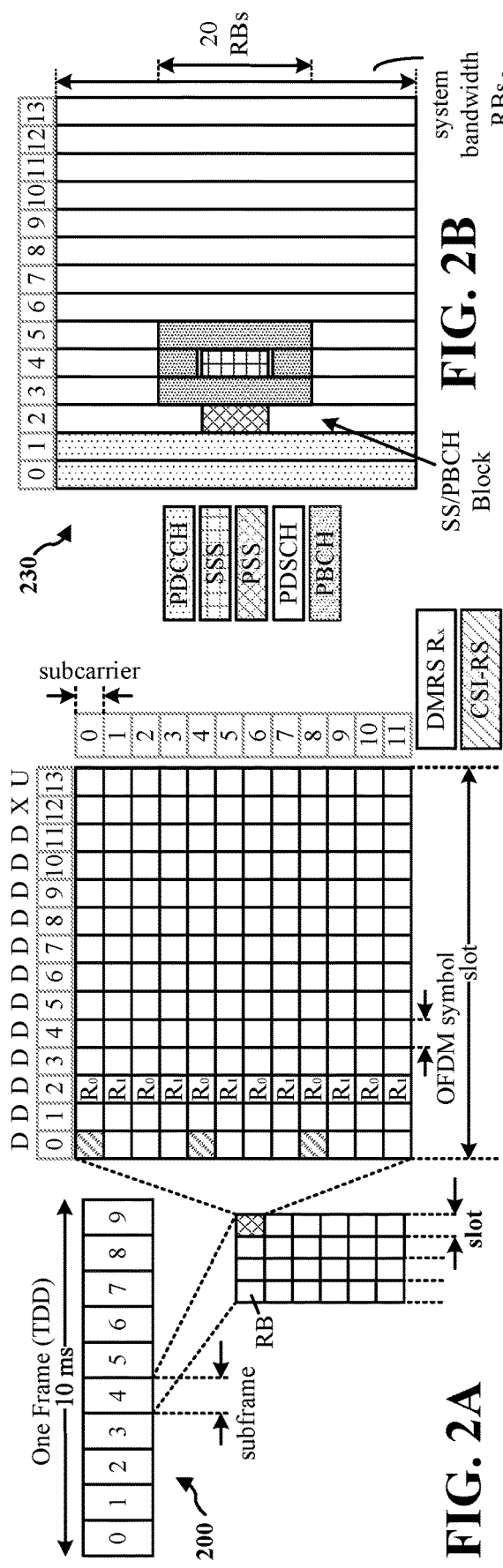
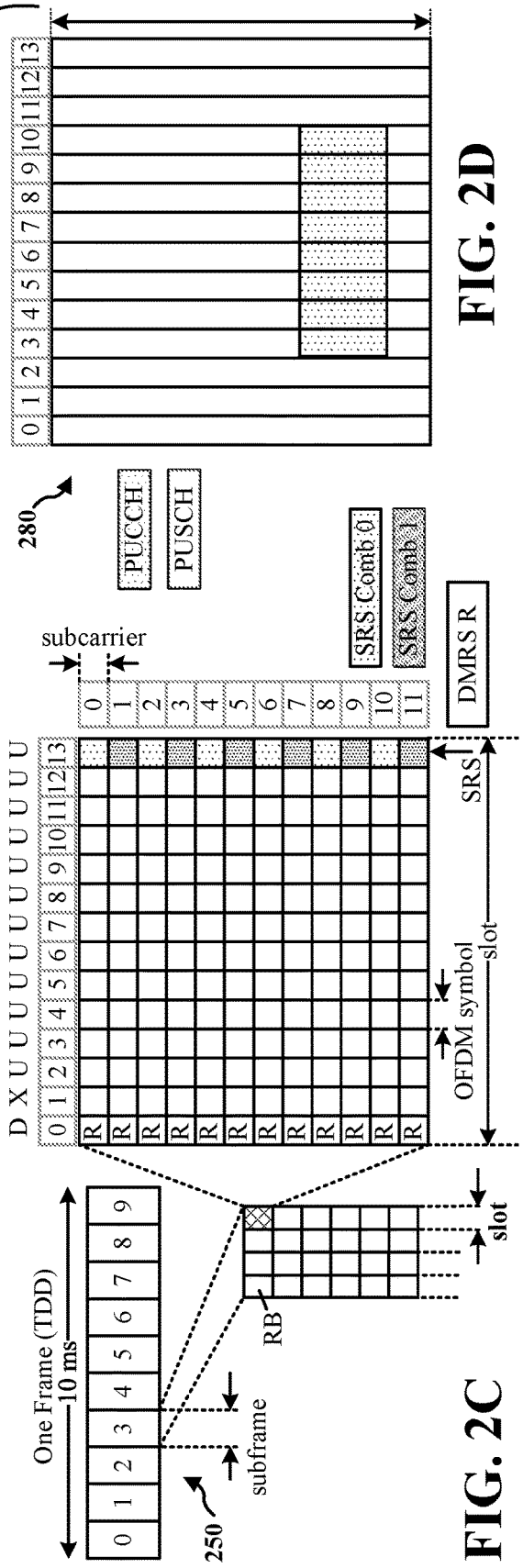
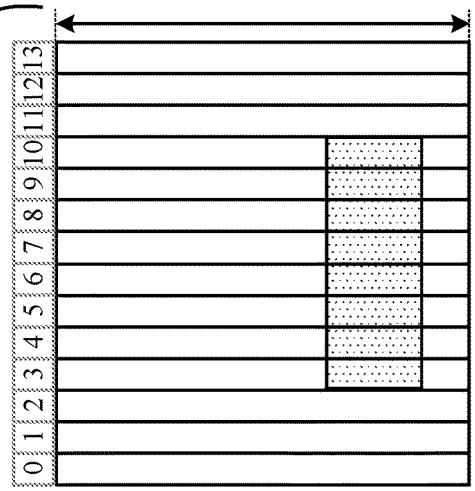

NARROW BANDWIDTH PART HOPPING PATTERN

TECHNICAL FIELD

The present disclosure relates to wireless communications using a frequency domain unit referred to as a narrow bandwidth part that follows a hopping pattern.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include receiving a configuration of one or more narrow bandwidth part (NBWP) hopping patterns for one or more configured NBWPs, each configured NBWP having a bandwidth less than or equal to a maximum configurable bandwidth of the UE. The method may include determining an active NBWP hopping pattern for an active NBWP of the one or more configured NBWPs. The method may include communicating on frequency domain resources for a frequency domain hop indicated by the active NBWP hopping pattern applied to the active NBWP.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at an apparatus of a base station (BS). The method may include configuring one or more UEs with one or more NBWP hopping patterns for one or more configured NBWPs, each configured NBWP having a bandwidth less than or equal to a maximum configurable bandwidth of the UE. The method may include determining, for a UE of the UEs, an active NBWP hopping pattern for an active NBWP of the one or more configured NBWPs. The method may include communicating with the UE on frequency domain resources for a frequency domain hop indicated by the active NBWP hopping pattern applied to the active NBWP for the UE.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

DETAILED DESCRIPTION

Figure 1:
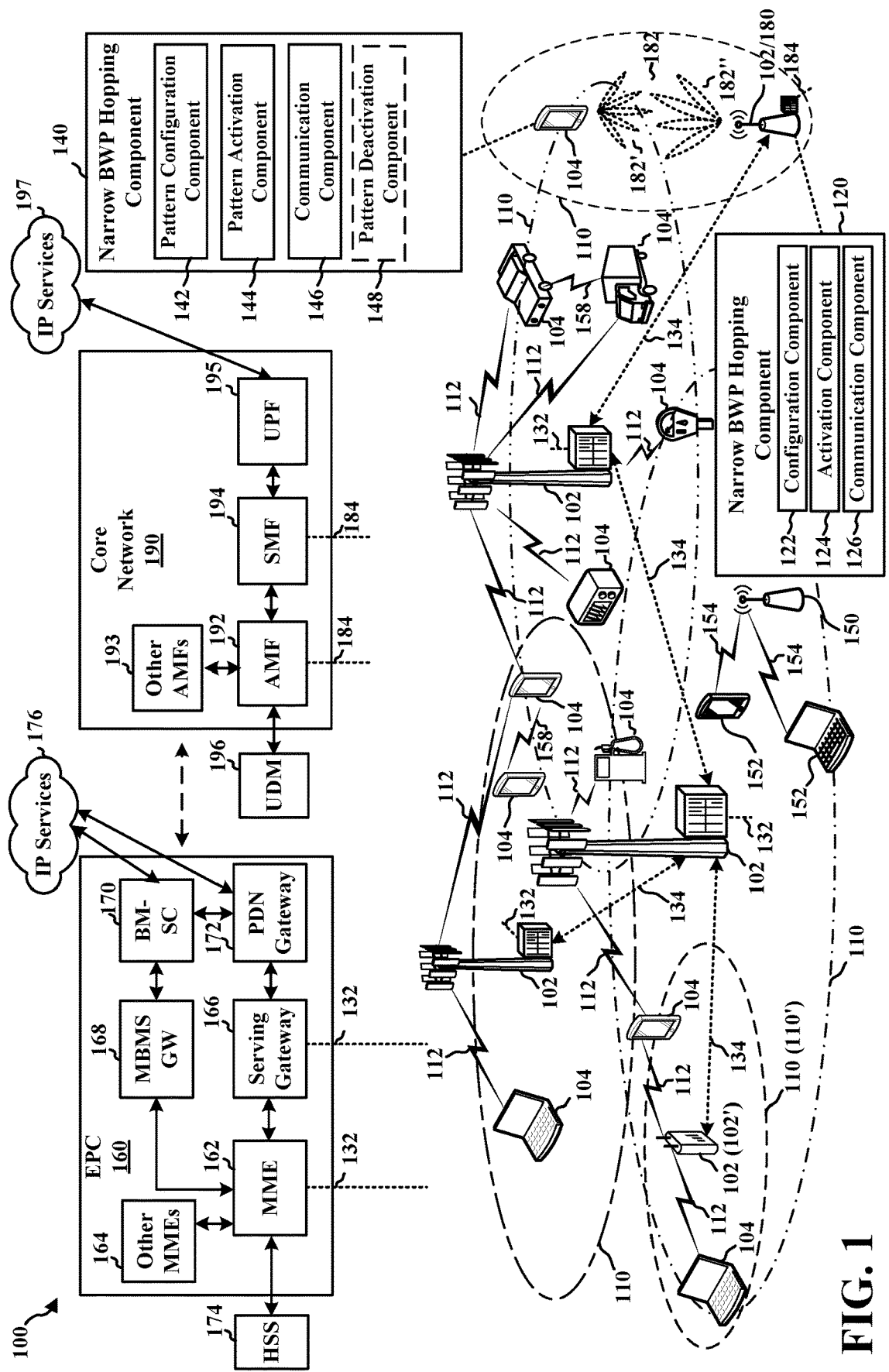
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) may utilize a subset of total cell bandwidth of a cell referred to as a Bandwidth Part (BWP). For example, in 5G NR releases 15 and 16, a maximum BWP size is 100 MHz. In higher frequency ranges (e.g., FR 2), the size of bandwidth parts may increase. Such large bandwidths may be designed to satisfy the demands of premium smartphones utilizing enhanced mobile broadband (eMBB) and other use cases such as ultra-reliable low latency communication (URLLC) and vehicle to anything (V2X). For some devices, referred to as reduced capability or RedCap devices, a narrower bandwidth part (NBWP) may be desirable for reduced complexity and power saving. That is, a first type of UE be capable of using a BWP of the maximum BWP size, whereas a RedCap UE may be a second type of UE that has lower maximum BWP size than the first type of UE for a frequency range. Example RedCap devices may include wearables, industrial wireless sensor networks (IWSN), surveillance cameras, and low-end smartphones. For instance, data rates for RedCap devices may be achieved with BWP sizes less than 100 MHz in FR2. In an example implementation, in FR1, a maximum device bandwidth for a non-RedCap device may be 100 MHz, while the maximum device bandwidth for a RedCap device may be 20 MHz. In FR2, the maximum device bandwidth for a non-RedCap device may be 200 MHz, while the maximum device bandwidth for a RedCap device may be 100 MHz. Other maximum device bandwidths may be applicable in other implementations. When a UE operates with a reduced BWP, it may be desirable to reduce narrowband interference effects and/or achieve frequency diversity gains.

In an aspect, the present disclosure provides for a NBWP hopping pattern that allows a UE configured with a NBWP to hop frequency (for example, within a larger BWP or within the carrier system bandwidth). The UE may be configured with separate NBWPs and NBWP hopping patterns. Each NBWP may be associated with one or more NBWP hopping patterns. The network may activate one NBWP hopping pattern to be applied to the active NBWP. Accordingly, both the UE and the network may communicate on a bandwidth at a given time based on a current hop of the NBWP hopping pattern. Procedures such as hybrid automatic repeat request (HARQ), timers, grants, etc. may be transparent to the frequency hopping pattern at least for the UE. That is, the UE may adjust the frequency domain resources based on the NBWP hopping pattern without changing scheduling procedures. The network may consider NBWP frequency hopping patterns when scheduling and adjust the NBWP frequency hopping patterns for one or more UEs to meet scheduling demands.

Particular implementations of the subject matter described in this disclosure can be implemented to realize one or more of the following potential advantages. RedCap devices may use a narrower bandwidth, which may save power. The NBWP frequency hopping pattern may mitigate narrowband interference effects by changing the frequency domain resources. Additionally, the NBWP frequency hopping pattern may hop over a larger bandwidth than the NBWP to provide frequency diversity gains.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 may include a NBWP hopping component 140 that manages a NBWP to frequency hop over time according to a NBWP hopping pattern. The NBWP hopping component 140 may include a pattern configuration component 142 configured to receive a configuration of one or NBWP hopping patterns for one or more configured NBWPs, each configured NBWP having a bandwidth less than or equal to a maximum configurable bandwidth of the UE 104. The NBWP hopping component 140 may include a pattern activation component 144 configured to determine an active NBWP hopping pattern for an active NBWP of the one or more configured NBWPs. The NBWP hopping component 140 may include communication component 146 configured to communicate on frequency domain resources for a frequency domain hop indicated by the active NBWP hopping pattern applied to the active NBWP. In some implementations, the NBWP hopping component 140 may optionally include a pattern deactivation component 148 configured to disable NBWP hopping in response to a disable command.

In some implementations, one or more of the base stations 102 may include a NBWP control component 120 configured to manage NBWP hopping pattern configurations for a UE and communicate with the UE over a NBWP according to the active NBWP hopping pattern. The NBWP control component 120 may include a configuration component 122 configured to configure one or more UEs with one or more NBWP hopping patterns for one or more configured NBWPs, each configured NBWP having a bandwidth less than or equal to a maximum configurable bandwidth of a respective UE. The NBWP control component 120 may include an activation component 124 configured to determine, for the respective UE, an active NBWP hopping pattern for an active NBWP of the one or more configured NBWPs. The NBWP control component 120 may include a communication component 126 configured to communicating with the respective UE on frequency domain resources for a frequency domain hop indicated by the active NBWP hopping pattern applied to the active NBWP for the UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP for a UE. The bandwidth of the NBWP is less than the carrier system bandwidth. The NBWP may hop over the maximum configurable bandwidth of a BWP for the UE or over the carrier system bandwidth. The hopping may provide frequency diversity gains without increasing the BWP size over the size of a NBWP.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
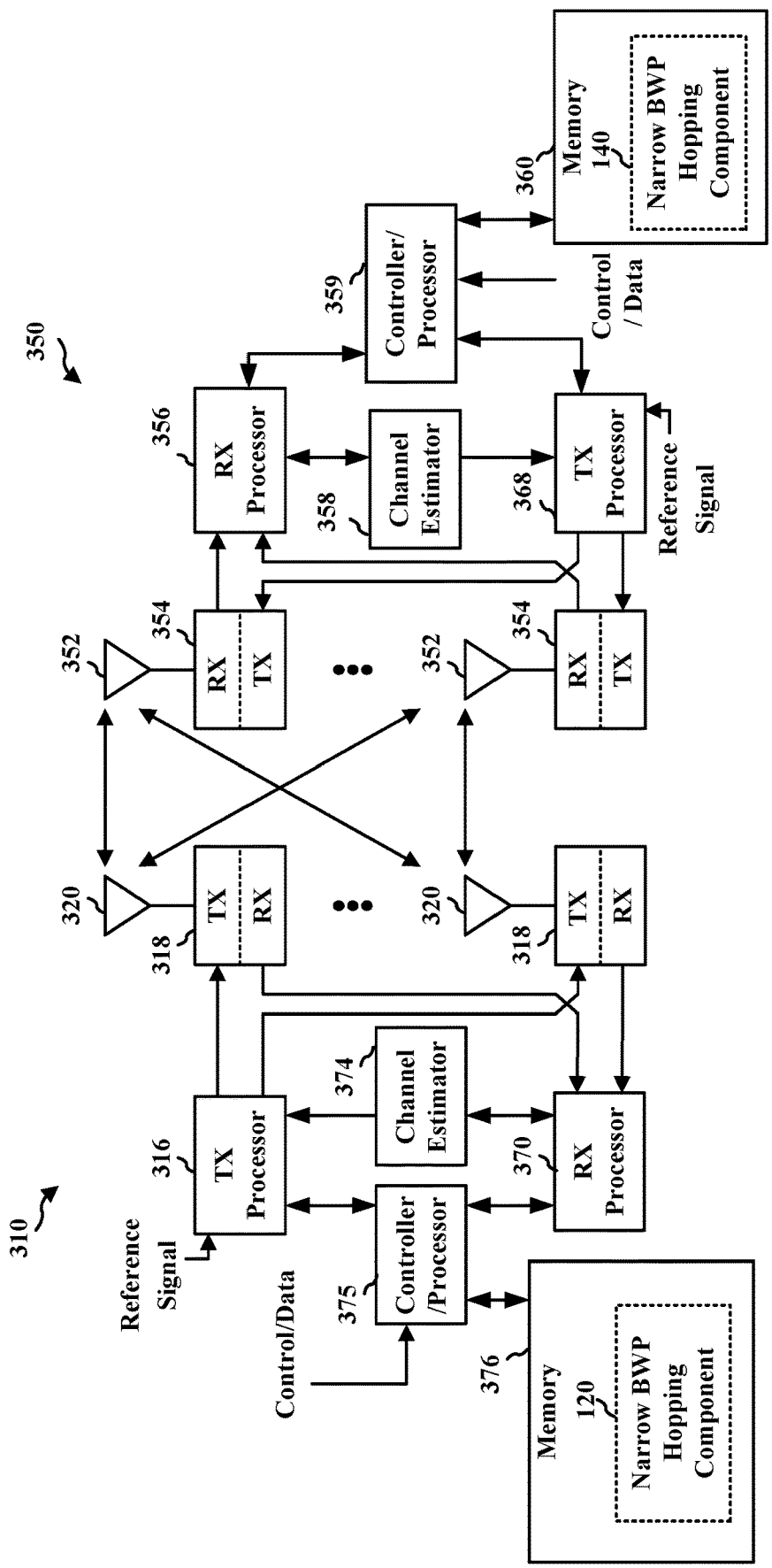
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the NBWP hopping component 140 of FIG. 1. For example, the memory 360 may include executable instructions defining the NBWP hopping component 140. The TX processor 368, the RX processor 356, and/or the controller/processor 359 may be configured to execute the NBWP hopping component 140.

At least one of the TX processor 316, the RX processor 370, and the controller/processor 375 may be configured to perform aspects in connection with the NBWP control component 120 of FIG. 1. For example, the memory 376 may include executable instructions defining the NBWP control component 120. The TX processor 316, the RX processor 370, and/or the controller/processor 375 may be configured to execute the NBWP control component 120.

Figure 4:
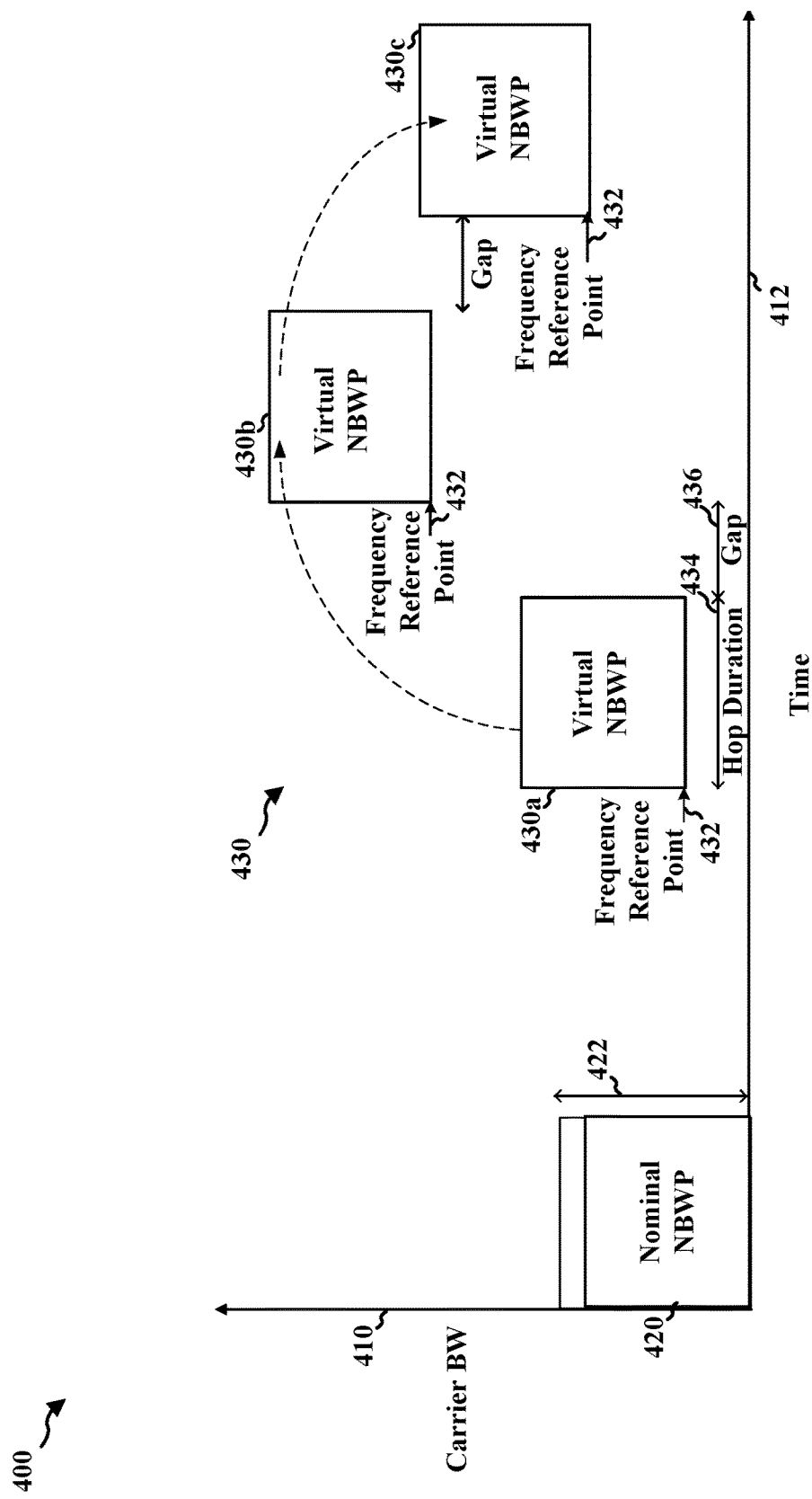
FIG. 4 is a diagram illustrating an example of narrow bandwidth part (NBWP) hopping.

FIG. 4 is a diagram 400 illustrating an example of NBWP hopping. A UE 104 may be configured with a nominal active BWP 420 within a carrier bandwidth 410 that hops over time 412. The nominal active BWP 420 may be configured with a bandwidth up to a maximum BWP bandwidth 422 of a UE for a frequency range. For instance, for FR1, the maximum BWP bandwidth 422 may be 100 MHz. For a NBWP, the bandwidth of the nominal active BWP 420 may be less than or equal to the maximum BWP bandwidth 422. The bandwidth of the nominal active BWP 420 may be less than a carrier bandwidth 410. NBWP hopping allows the active BWP for a UE to hop over different frequencies within the carrier bandwidth 410. For example, a UE 104 may be configured with one or more virtual NBWPs 430 (e.g., NBWP 430a, 430b, and 430c). Each virtual NBWP 430 may be defined by a frequency reference point 432 and a hop duration 434. The virtual NBWPs 430 may be separated by gaps 436. Resources within a virtual NBWP may be defined relative to the frequency reference point 432 for the virtual NBWP 430. Procedures such as hybrid automatic repeat request (HARQ), timers, grants, etc. may be transparent to frequency hopping. That is, the procedures may be signaled as if the nominal NBWP 420 is to be used, but transmissions may actually occur on the virtual NBWP 430 at the time of the transmission.

In an aspect, the present disclosure provides for NBWP hopping patterns that can be associated with one or more configured NBWPs for a UE. NBWP hopping patterns may simplify signaling related to virtual NBWPs. In particular, configuration and activation of virtual NBWPs according to NBWP hopping patterns may allow determination of the virtual NBWP for a UE at a given time. The active NBWP hopping pattern may be dynamically changed among configured NBWP hopping patterns. In some implementations, the NBWP hopping pattern may be deactivated or a default NBWP hopping pattern (e.g., with a single hop and infinite duration) may be activated.

Figure 5:
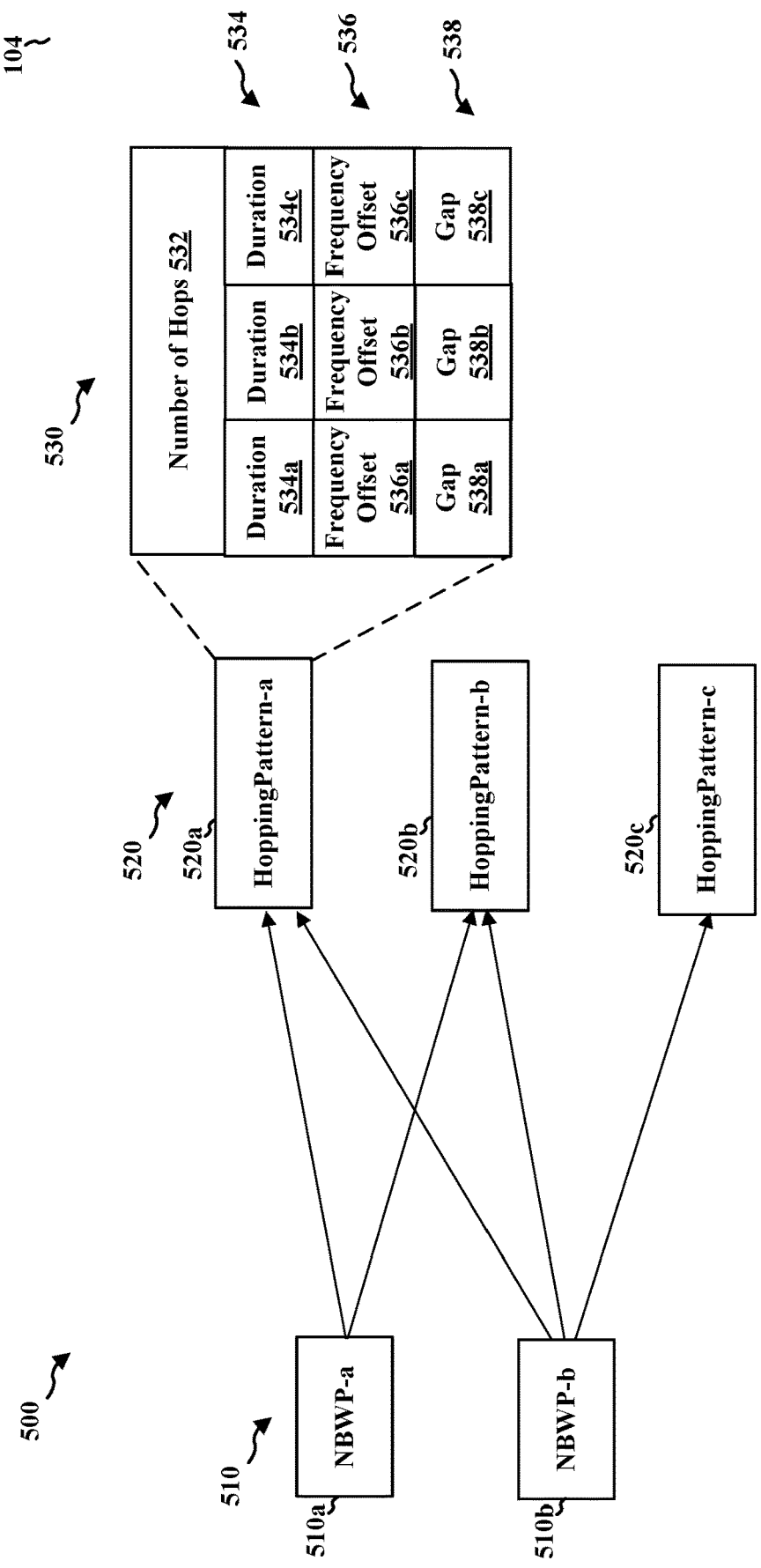
FIG. 5 is a diagram illustrating an example configuration of NBWPs and a NBWP hopping pattern.

FIG. 5 is a diagram illustrating an example configuration 500 of NBWPs 510 and NBWP hopping patterns 520. The NBWPs 510 (e.g., NBWP 510a and 510b) may be configured for each serving cell. The NBWPs 510 may be configured via RRC configuration messages. Generally, a UE has one active BWP for each serving cell. The active BWP may be dynamically selected based on PDCCH signaling (e.g., downlink control information (DCI)), timers, or UE status. The active BWP may correspond to the nominal NBWP 420.

The NBWP hopping patterns 520 (e.g., NBWP hopping patterns 520a, 520b, and 520c) may be similarly configured via RRC signaling. The RRC signaling may be specific to the UE 104 or the cell. Each NBWP 510 may be configured or associated with one or more NBWP hopping patterns 520. For example, the NBWP 510a may be associated with the NBWP hopping patterns 520a and 520b and the NBWP 510b may be associated with the NBWP hopping patterns 520a, 520b, and 520c.

The configuration 530 for each hopping pattern 520 may include a number of hops 532. In some implementations, the number of hops may be represented as (n) and an index of a hop may be represented as (i). For each hop, the configuration 530 may include a duration 534 (e.g., duration 534a, 534b, or 534c) and a frequency offset 536 (e.g., frequency offset 536a, 536b, or 536c) for the respective hop. In some implementations, the configuration 530 may include a gap 538 (e.g., gap 538a, 538b, or 538c) for each hop. The hop duration 534 ($T_{hop, i}$) may be duration for which a virtual NBWP is active on certain frequency resources. The hop duration 534 may be the same or different for each hop within a hopping pattern 520. The hop frequency offset 536 ($FO_{hop,i}$) may be a frequency offset of the respective hop from a reference frequency. The hop frequency offset 536 may indicate the beginning of virtual NBWP resources on the frequency grid. In some implementations, the hop frequency offset 536 may be defined based on the carrier center frequency, the lowest resource element (RE) or physical resource block (PRB) index of the nominal NBWP 510. In some implementations, the hop frequency offset may be described as an integer or fractional multiple of the NBWP bandwidth. For instance, frequency offset 536a may be −1 times the nominal NBWP bandwidth, frequency offset 536b may be 0 times the nominal NBWP bandwidth, and frequency offset 536c may be 1 times the nominal NBWP bandwidth.

Figure 6:
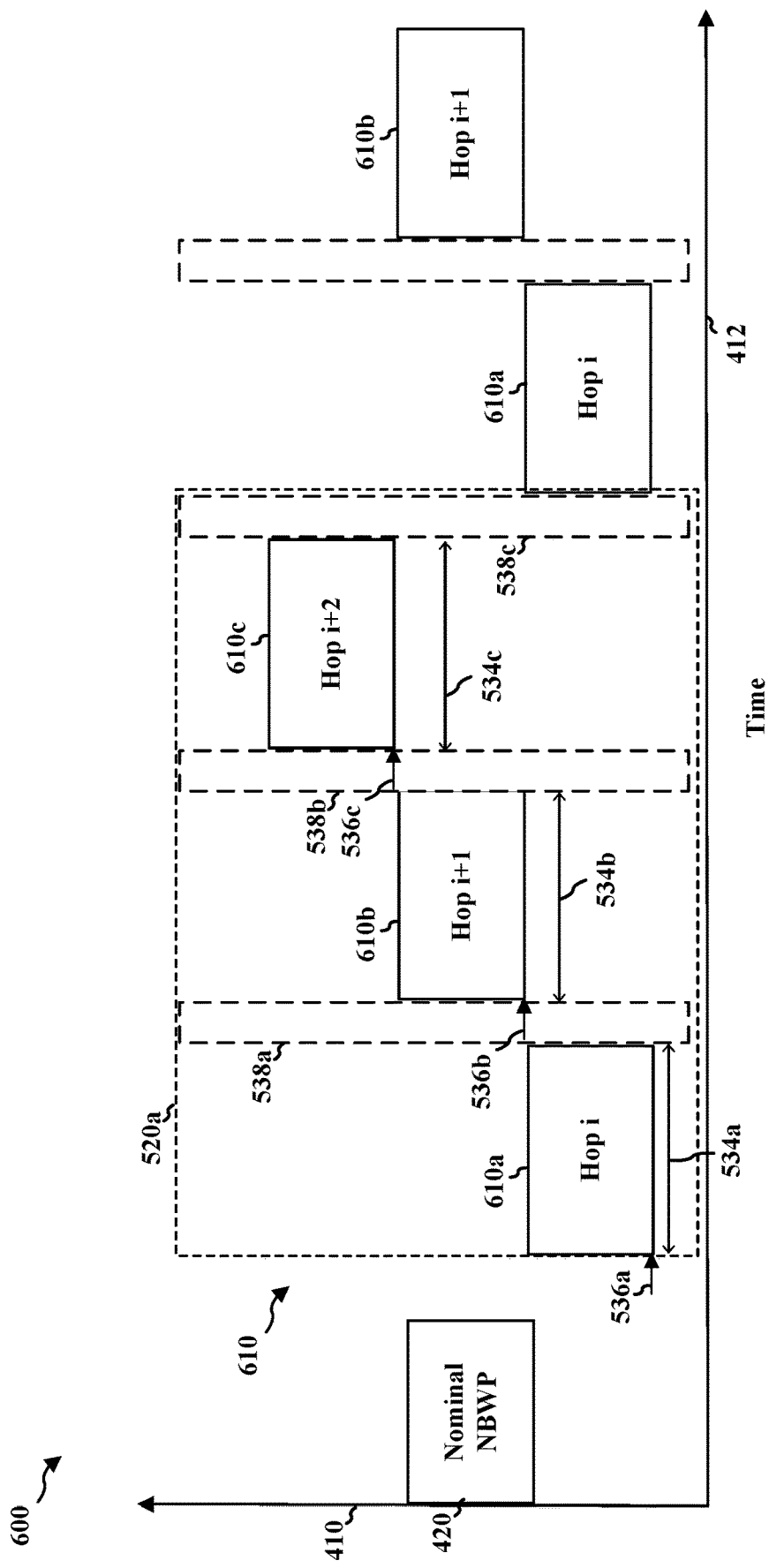
FIG. 6 is a diagram illustrating the example hopping pattern of FIG. 5 applied to a nominal NBWP.

FIG. 6 is a diagram 600 of the NBWP hopping pattern 520a of FIG. 5 applied to the nominal NBWP 420. The NBWP hopping pattern 520a may include 3 hops 610 (e.g., hop 610a, 610b, and 610c). Each hop 610 may be defined by a respective duration 534, frequency offset 536, and gap 538. In the illustrated example, the duration 534 and the gap 538 may be the same for each hop 610, but the duration 534 and gap 538 may be different for each hop 610. After the hop 610c, the NBWP hopping pattern 520a may repeat.

Figure 7:
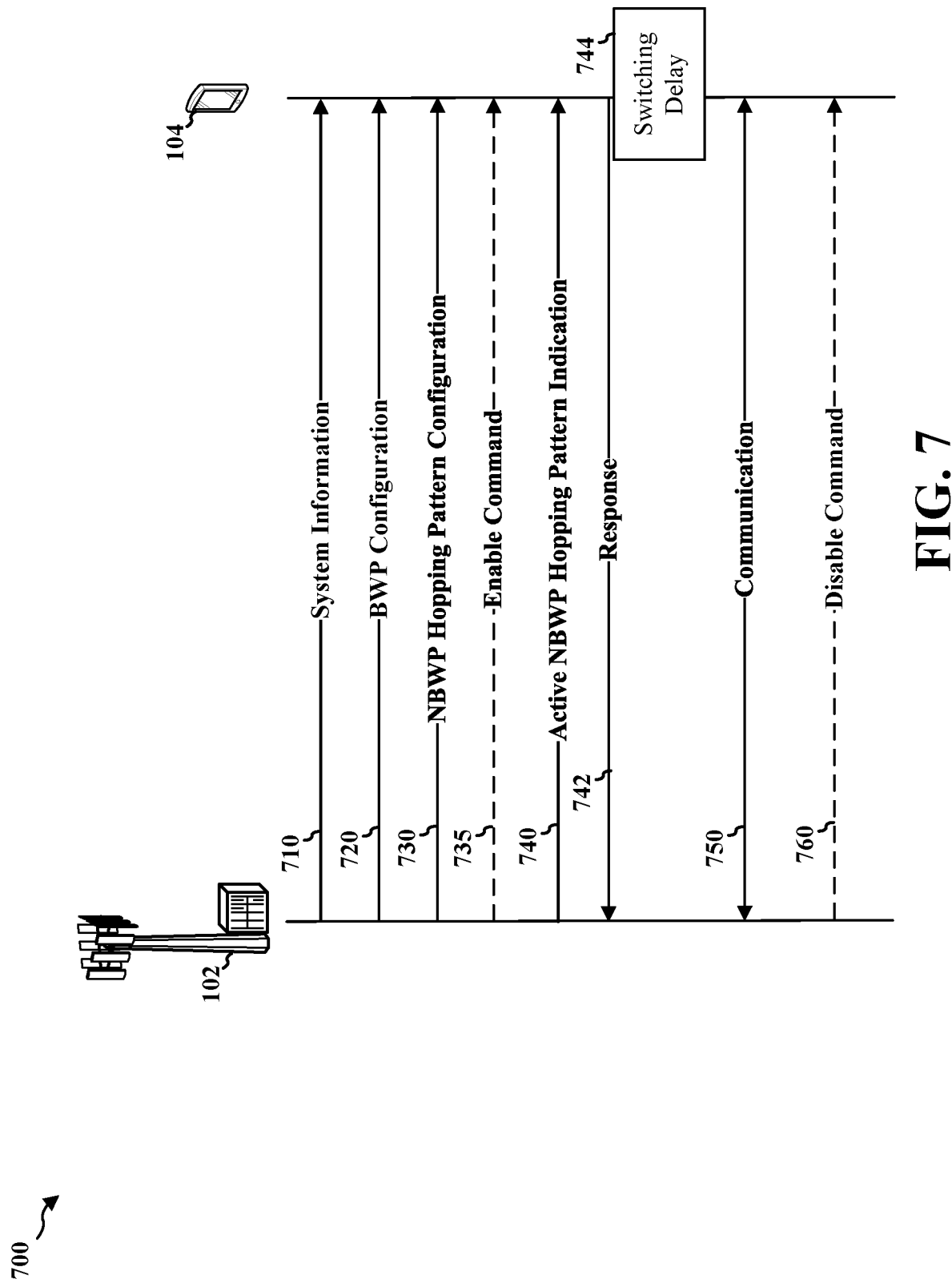
FIG. 7 is a message diagram illustrating example messages for managing NBWP hopping patterns.

FIG. 7 is a message diagram 700 illustrating example messages between a base station 102 and a UE 104 for managing a NBWP hopping pattern. The base station 102 may broadcast system information 710. The system information 710 may define an initial BWP that may be used by one or more UEs 104. The system information 710 may transmit a BWP configuration 720 to the UE 104. The BWP configuration 720 may be, for example, an RRC message that configures the NBWPs 510.

The base station 102 may transmit a NBWP hopping pattern configuration message 730 to the UE 104. The NBWP hopping pattern configuration message 730 may be, for example, an RRC message that configures the NBWP hopping patterns 520. The NBWP hopping pattern configuration message 730 may be UE specific, UE type specific, or cell specific. A non-RedCap UE or baseline device may refer to a first type of UE capable of using a BWP of a maximum BWP size, whereas a RedCap UE may refer a second type of UE that has lower maximum BWP size than the first type of UE for a frequency range. Descriptions here of a non-RedCap UE and a RedCap UE may be equally applicable the first type of UE and the second type of UE. In an aspect, a RedCap UE may signal a maximum configurable bandwidth (e.g., via an RRC capability message). The NBWP hopping pattern configuration message 730 may be specific for a first type of UE (e.g., non-RedCap UEs) or a second type of UE (e.g., RedCap UEs). The NBWP hopping pattern configuration message 730 may also associate each NBWP hopping pattern 520 with one or more of the configured NBWPs 510 of the UE 104.

The base station 102 may indicate an active NBWP hopping pattern. In some implementations, if no NBWP hopping pattern 520 is currently active (e.g., NBWP hopping is currently disabled), base station 102 may transmit an enable command 735. The enable command 735 may indicate the active hopping pattern for the UE 104. The base station 102 may also change the active NBWP hopping pattern. For example, the base station 102 may transmit an active NBWP hopping pattern indication 740 that indicates a target hopping pattern for the UE 104. For example, the network may switch the active NBWP hopping pattern 520 for a cell or a UE based on channel conditions, network load, or other factors. In some implementations, the active NBWP hopping pattern indication 740 may be used to enable NBWP hopping. The active NBWP hopping pattern indication 740 may apply to one or more UEs and may be transmitted as a MAC-CE, DCI, or an RRC message. In some implementations, the NBWP hopping pattern configuration message 730 may specify a timer for changing the active NBWP hopping pattern 520. The UE 104 may transmit a response 742 in response to the active NBWP hopping pattern indication 740. The response 742 may explicitly or implicitly indicate that the active NBWP hopping pattern indication 740 was received. For example, the response 742 may be a HARQ-ACK for a PDSCH carrying the active NBWP hopping pattern indication 740 as an RRC message or MAC-CE. As another example, the response 742 may be a PUSCH message scheduled by a DCI including the active NBWP hopping pattern indication 740.

The UE 104 may switch to the active NBWP hopping pattern 520 indicated by the NBWP hopping pattern indication 740 during a switching delay 744. The switching delay 744 may be a minimum time between receiving the indication of the target NBWP hopping pattern and communicating according to the target NBWP hopping pattern. That is, the UE may be able to transmit or receive on the time and frequency resource configured according to the active NBWP hopping pattern 520 after the switching delay 744, which may be referred to as $T_{NBWP\text{-}HP\text{-}SwitchDelay}$. The switching delay 744 may depend on the relation between the source hopping pattern 520 and the target hopping pattern 520, e.g., frequency span of the hopping patterns 520, a frequency separation between the last active hop in the source hopping pattern 520 and the first hop in the target hopping pattern 520, etc. The switching delay 744 may depend on the signaling used to initiate the NBWP hopping pattern switch (e.g., the active NBWP hopping pattern indication 740). The switching delay 744 may depend on the SCS of the active NBWP 510. The switching delay 744 may depend on a combination of the preceding factors.

The UE 104 may switch to the new active NBWP hopping pattern according to one or more rules. According to a first example rule, the UE 104 may switch to a hop of the new active NBWP hopping pattern immediately after the switching delay 744. For example, the UE 104 may switch to a first hop in the new active NBWP hopping pattern. As another example, the UE 104 may switch to a closest hop in frequency to the current hop, which may reduce the switching delay 744. According to a second example rule, the UE 104 may complete a current cycle of the old NBWP hopping pattern before switching. Once again, the UE 104 may switch to the first hop of the new pattern or the closest hop in frequency. According to a third example rule, the UE 104 may continue to hop according to the current NBWP hopping pattern until there is an overlapping hop with the new active NBWP hopping pattern, then switch to the new pattern starting at the overlapping hop.

In another aspect, the active NBWP hopping pattern indication 740 may be implicitly indicated by a DCI scheduling a downlink or uplink transmission on a new hopping pattern. For example, the DCI may indicate a frequency domain resource allocation outside of the current hopping pattern. In this example, the UE 104 may switch immediately to the hop containing the scheduled transmission and continue with the new active NBWP hopping pattern after the scheduled transmission.

The base station 102 and the UE 104 may exchange communication 750 according to the active NBWP hopping pattern. The communication 750 may refer to any transmission scheduled on the active NBWP 510. For example, if the active NBWP 510 is a downlink BWP, the communication 750 may be a PDCCH or PDSCH. If the active NBWP 510 is an uplink BWP, the communication 750 may be a PUCCH or PUSCH.

In an aspect, the base station 102 may transmit a disable command 760 to disable a NBWP hopping pattern. For example, the disable command 760 may be a MAC-CE, DCI, or RRC message. In some implementations, the NBWP hopping pattern configuration message 730 may specify a timer for disabling active NBWP hopping pattern 520. When the active NBWP hopping pattern 520 is disabled the UE 104 may stay on a current hop 610 and discontinue hopping. In this case, no switching delay 744 is associated with disabling NBWP the hopping pattern. Alternatively, the UE 104 may switch to a default hop in response to the disable command 760. The default hop may be preconfigured per NBWP 510 or per NBWP hopping pattern 520. The UE 104 may switch to the default hop after a switching delay 744.

In another aspect, one of the configured NBWP hopping patterns 520 may correspond to disabled NBWP hopping. For example, a disabled NBWP hopping pattern 520 may include a single hop with a frequency offset 536 of 0 and infinite duration 534. The base station 102 may disable NBWP hopping by transmitting the active NBWP hopping pattern indication 740 indicating the disabled NBWP hopping pattern 520. The UE 104 may immediately switch to the disabled NBWP hopping pattern 520.

Figure 8:
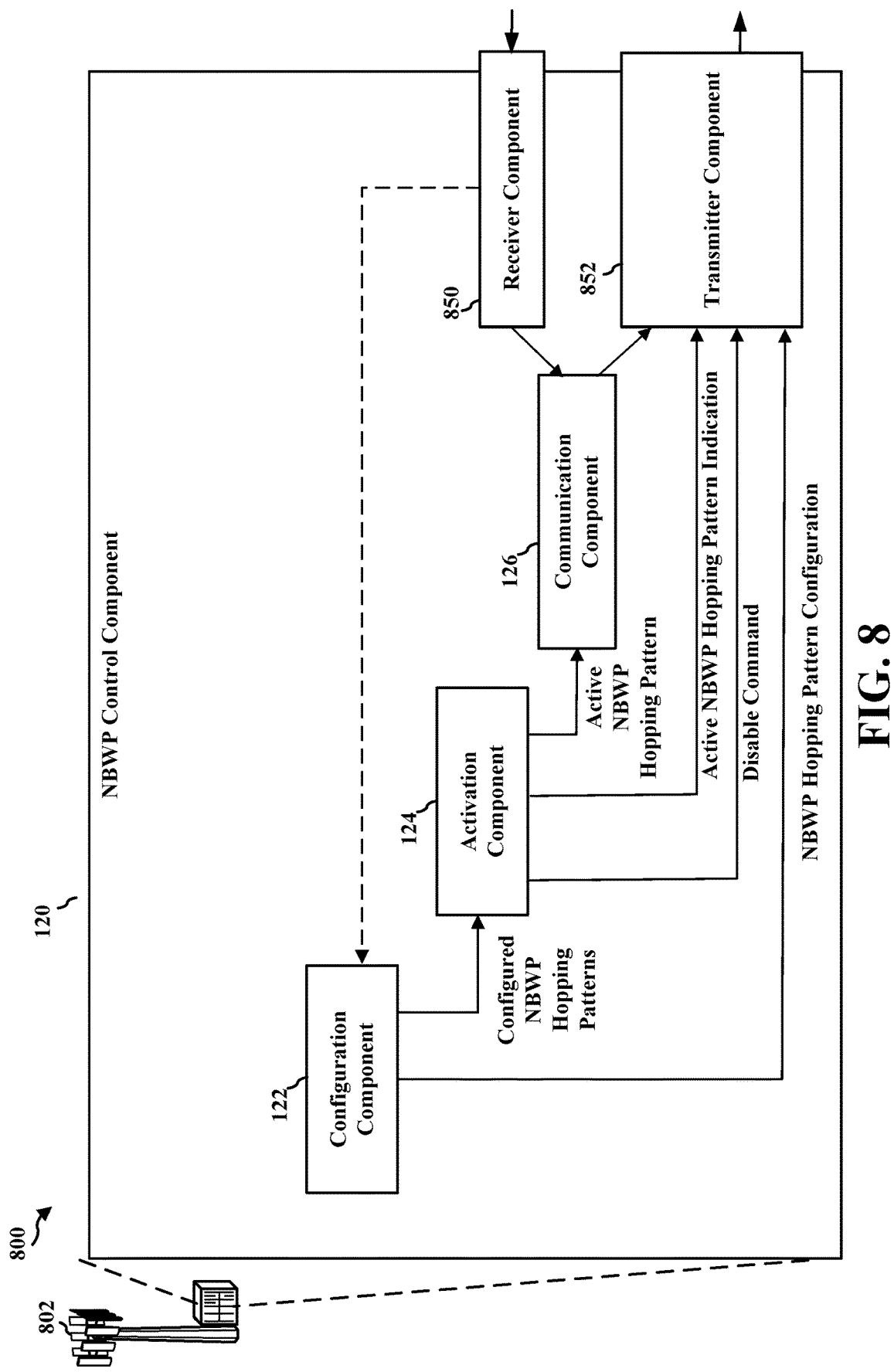
FIG. 8 is a conceptual data flow diagram illustrating the data flow between different means/components in an example BS.

FIG. 8 is a conceptual data flow diagram 800 illustrating the data flow between different means/components in an example base station 802, which may be an example of the base station 102 including the NBWP control component 120. The NBWP control component 120 may be implemented by the memory 376 and the TX processor 316, the RX processor 370, and/or the controller/processor 375 of FIG. 3. For example, the memory 376 may store executable instructions defining the NBWP control component 120 and the TX processor 316, the RX processor 370, and/or the controller/processor 375 may execute the instructions.

The base station 102 may include a receiver component 850, which may include, for example, a radio frequency (RF) receiver for receiving the signals described herein. The base station 102 may include a transmitter component 852, which may include, for example, an RF transmitter for transmitting the signals described herein. In an aspect, the receiver component 850 and the transmitter component 852 may co-located in a transceiver such as illustrated by the TX/RX 318 in FIG. 3.

As discussed with respect to FIG. 1, the NBWP control component 120 may include the pattern configuration component 142, the pattern activation component 144, and the communication component 146.

The receiver component 850 may receive UL signals from the UE 104 including UL communications. In some implementations, the receiver component 850 may optionally receive a random access message from the UE 104 seeking to connect to the base station 802. The receiver component 850 may provide an identification of the UE 104 to the configuration component 122.

The configuration component 122 may receive an identification of a UE 104 from the receiver component 850. The configuration component 122 may transmit one or more configuration messages to the UE 104 via the transmitter component 852. For example, the configuration messages may be RRC configuration message. In particular, the configuration component 122 may transmit the NBWP hopping pattern configuration message 730. The NBWP hopping pattern configuration message 730 may include one or more NBWP hopping pattern configuration 530. The configuration component 122 may provide the configure NBWP hopping patterns to the activation component 124.

The activation component 124 may receive the configured NBWP hopping patterns for a UE from the configuration component 122. The activation component 124 may determine whether to activate any of the configured NBWP hopping patterns. For example, the activation component 124 may select a configured NBWP hopping pattern base on UE channel feedback, base station channel measurements, or network load. The activation component 124 may transmit an active NBWP hopping pattern indication 740 via the transmitter component 852. In some implementations, if no NBWP hopping pattern is currently active, the activation component 124 may transmit an enable command 735 indicating the new active NBWP hopping pattern. In some implementations, if the activation component 124 determines to disable NBWP hopping, the activation component 124 may transmit a disable command 760. In any case, the activation component 124 may provide the active NBWP hopping pattern (if any) to the communication component 126.

The communication component 126 may receive the active NBWP hopping pattern from the activation component 124. The communication component 126 may determine a current hop based on the active NBWP hopping pattern. The communication component 126 may tune the receiver component 850 and/or the transmitter component 852 to the correct bandwidth based on the current hop. The communication component 126 may receive uplink communications (e.g., PUSCH and/or PUCCH) from the receiver component 850. The communication component 126 may transmit downlink communications (e.g., PDCCH and/or PDSCH) via the transmitter component 852.

Figure 9:
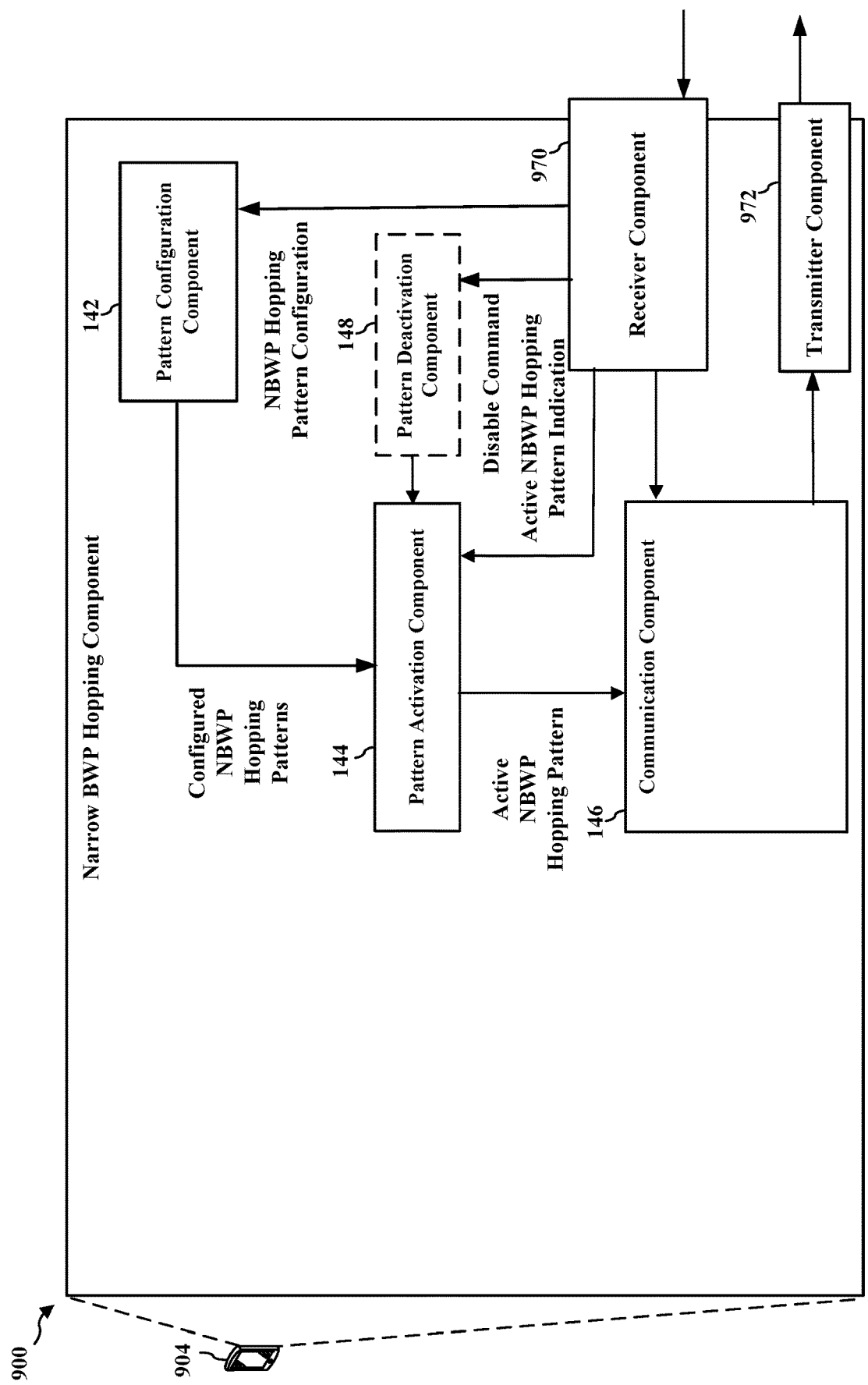
FIG. 9 is a conceptual data flow diagram illustrating the data flow between different means/components in an example UE.

FIG. 9 is a conceptual data flow diagram 900 illustrating the data flow between different means/components in an example UE 904, which may be an example of the UE 104 and include the NBWP hopping component 140. The NBWP hopping component 140 may be implemented by the memory 360 and the TX processor 368, the RX processor 356, and/or the controller/processor 359. For example, the memory 360 may store executable instructions defining the NBWP hopping component 140 and the TX processor 368, the RX processor 356, and/or the controller/processor 359 may execute the instructions.

The UE 104 may include a receiver component 970, which may include, for example, a RF receiver for receiving the signals described herein. The UE 104 may include a transmitter component 972, which may include, for example, an RF transmitter for transmitting the signals described herein. In an aspect, the receiver component 970 and the transmitter component 972 may co-located in a transceiver such as the TX/RX 352 in FIG. 3.

As discussed with respect to FIG. 1, the NBWP hopping component 140 may include the pattern configuration component 142, the pattern activation component 144, and the communication component 146. The NBWP hopping component 140 may optionally include the pattern deactivation component 148.

The receiver component 970 may receive DL signals described herein such as the system information 710, BWP configuration 720, NBWP hopping pattern configuration message 730, enable command 735, active NBWP hopping pattern indication 740, disable command 760, and downlink communications. The receiver component 970 may provide the system information 710, BWP configuration 720, and NBWP hopping pattern configuration message 730 to the pattern configuration component 142. The receiver component 970 may provide the enable command 735 and/or active NBWP hopping pattern indication 740 to the activation component 144. The receiver component 970 provide a disable command to the deactivation component 148. The receiver component 970 may provide downlink communications to the communication component 146.

The pattern configuration component 142 may receive configuration messages from the receiver component 970. In particular, the pattern configuration component 142 may receive the NBWP hopping pattern configuration message 730 including one or more configurations 530. The pattern configuration component 142 may extract the parameters (e.g., number of hops 532, duration 534, frequency offset 536, and gap 538) from the configurations 530 and store the hopping patterns 520. The pattern configuration component 142 may provide the configured NBWP hopping patterns 520 to the pattern activation component 144.

The pattern activation component 144 may receive the configured NBWP hopping patterns from the pattern configuration component 142. The pattern activation component 144 may receive an indication of one of the configured NBWPs as a target NBWP hopping pattern. For example, the pattern activation component 144 may receive the enable command 735 or the active NBWP hopping pattern indication 740 via the receiver component 970. The pattern activation component 144 may identify one of the configured NBWP hopping patterns 520 indicated by the indication. The pattern activation component 144 may provide the active NBWP hopping pattern to the communication component 146. In some implementations, the indication may identify a default NBWP hopping pattern that includes a single hop. By selecting the default NBWP hopping pattern, the pattern activation component 144 may disable NBWP hopping. In some implementations, where the NBWP hopping component 140 includes the pattern deactivation component 148, the pattern activation component 144 may indicate to the communication component 146 that no BWP hopping pattern is active.

The communication component 146 may receive the active NBWP hopping pattern from the pattern activation component 144. The communication component 146 may determine a current hop based on the active NBWP hopping pattern. The communication component 146 may tune the receiver component 970 and/or the transmitter component 972 based on the current hop. The communication may transmit uplink communications (e.g., PUSCH and/or PUCCH) via the transmitter component 972. The communication component 126 may receive downlink communications (e.g., PDCCH and/or PDSCH) via the receiver component 970.

Figure 10:
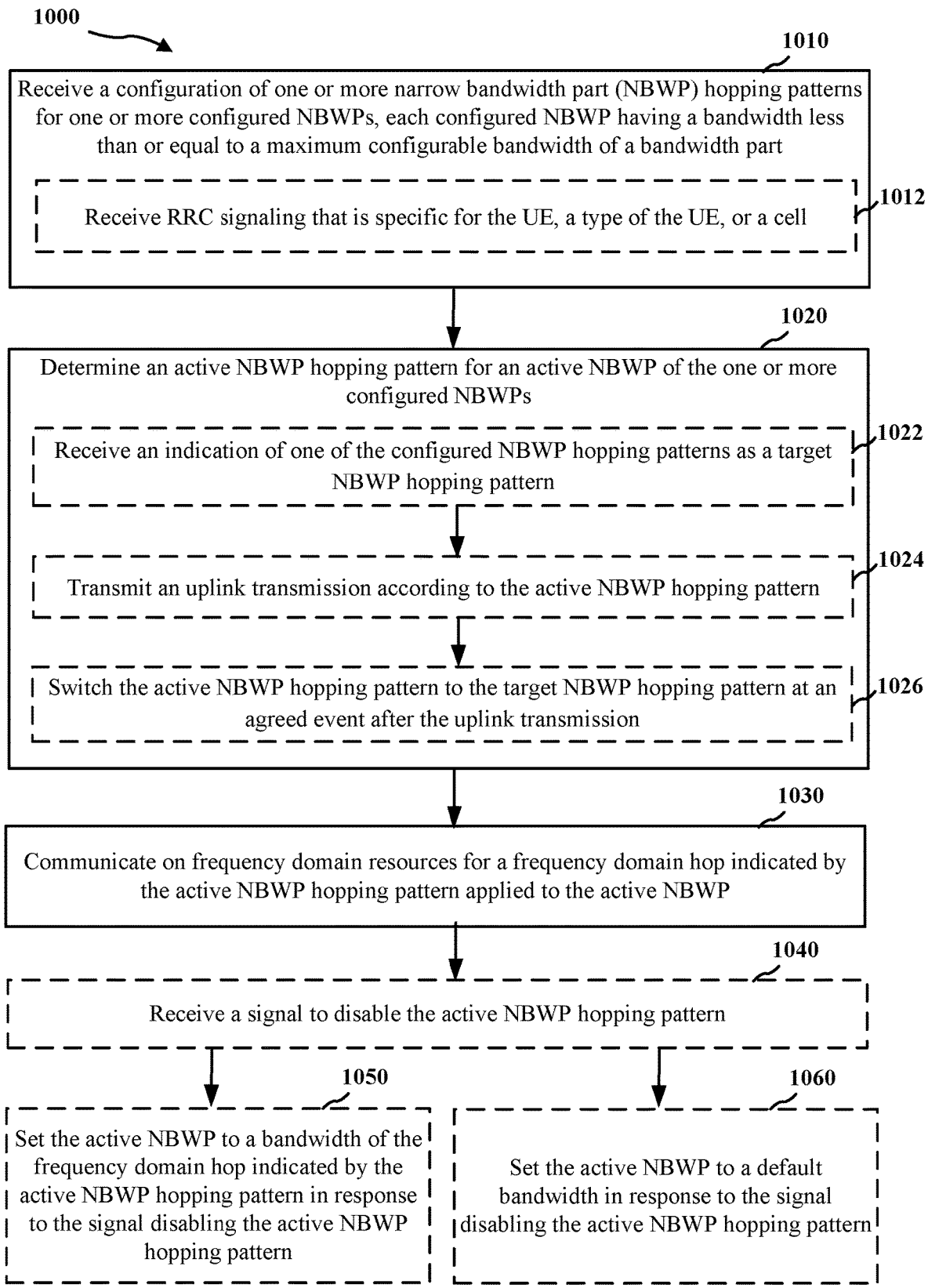
FIG. 10 is a flowchart of an example method for a UE to perform NBWP hopping according to a hopping pattern.

FIG. 10 is a flowchart of an example method 1000 for a UE to perform NBWP hopping according to a configured and activated hopping pattern. The method 1000 may be performed by a UE (such as the UE 104, which may include the memory 360 and which may be the entire UE 104 or a component of the UE 104 such as the NBWP hopping component 140, TX processor 368, the RX processor 356, or the controller/processor 359). The method 1000 may be performed by the NBWP hopping component 140 in communication with the NBWP control component 120 of the base station 102. Optional blocks are shown with dashed lines.

At block 1010, the method 1000 may include receiving a configuration of one or more NBWP hopping patterns for one or more configured NBWPs, each configured NBWP having a bandwidth less than or equal to a maximum configurable bandwidth of a bandwidth part. In some implementations, for example, the UE 104, the RX processor 356 or the controller/processor 359 may execute the NBWP hopping component 140 or the pattern configuration component 142 to receive the NBWP hopping pattern configuration message 730. For example, at sub-block 1012, the block 1010 may include receiving RRC signaling that is specific for the UE 104, a type of the UE 104, or a cell. The NBWP hopping pattern configuration message 730 may include one or more NBWP hopping pattern configurations 530 for a respective NBWP hopping pattern 520. The configuration 530 of one or more NBWP hopping patterns may include a number of hops 532 for each hopping pattern, and a hop duration 534 and a hop frequency offset 536 for each of the number of hops. The configuration 530 may optionally include a duration of the gap 538 for each hop 610. In some implementations, the hop frequency offset is measured from one of: a carrier center frequency, a lowest resource element of the active NBWP, or a lowest physical resource block index of the active NBWP. In some implementations, the hop frequency offset is a multiple of a bandwidth of the active NBWP. The NBWP hopping pattern configuration message 730 may associate each NBWP hopping pattern 520 with one or more configured NBWPs 510. Each NBWP 510 has a bandwidth less than or equal to the maximum BWP bandwidth 422 for the UE. The bandwidth of the NBWPs 510 is less than a carrier bandwidth 410. Accordingly, the UE 104, the RX processor 356, or the controller/processor 359 executing the NBWP hopping component 140 or the pattern configuration component 142 may provide means for receiving a configuration of one or more NBWP hopping patterns for one or more configured NBWPs.

At block 1020, the method 1000 may include determining an active NBWP hopping pattern for an active NBWP of the one or more configured NBWPs. In some implementations, for example, the UE 104, the RX processor 356 or the controller/processor 359 may execute the NBWP hopping component 140 or the pattern activation component 144 to determine the active NBWP hopping pattern (e.g., NBWP hopping pattern 520a) for an active NBWP (e.g., NBWP 510a) of the one or more configured NBWPs 510. In some implementations, at sub-block 1022, the block 1020 may include receiving an indication of one of the configured NBWP hopping patterns 520 as a target NBWP hopping pattern. For instance, the pattern activation component 144 may receive the enable command 735 or the active NBWP hopping pattern indication 740 specifying the target NBWP hopping pattern.

In some implementations, the UE 104 may not change NBWP hopping pattern until after a switching delay 744. The switching delay 744 may indicate a minimum time between receiving the indication of the target NBWP hopping pattern and communicating according to the target NBWP hopping pattern. The switching delay 744 may be based on: a relation between a source NBWP hopping pattern and the target NBWP hopping pattern, a type of the indication of the target NBWP hopping pattern, or a subcarrier spacing of the active NBWP, or a combination thereof. In some implementations, the indication of the target NBWP hopping pattern is a DCI indicating a communication outside of the active NBWP hopping pattern 520, in which case the pattern activation component 144 may switch to the target NBWP hopping pattern for the communication. In some implementations, the target NBWP hopping pattern is a default hopping pattern including a single hop. The default hopping pattern may be used to effectively disable NBWP hopping.

In some implementations, at sub-block 1024, the block 1020 may further include transmitting an uplink transmission according to the active NBWP hopping pattern. The uplink transmission may explicitly or implicitly acknowledge receipt of the indication in sub-block 1022. At sub-block 1026, the block 1020 may optionally further include switching the active NBWP hopping pattern 520 to the target NBWP hopping pattern 520a at an agreed event after the uplink transmission. For example, the agreed event may be an expiration of the switching delay 744, an expiration of a current hop, a completion of a NBWP hopping pattern, or an occurrence of an overlapping hop between the current active NBWP hopping pattern and the target NBWP hopping pattern. Accordingly, the UE 104, the RX processor 356, or the controller/processor 359 executing the NBWP hopping component 140 or the pattern activation component 144 may provide means for determining an active NBWP hopping pattern for an active NBWP of the one or more configured NBWPs.

At block 1030, the method 1000 may include communicating on frequency domain resources for a frequency domain hop indicated by the active NBWP hopping pattern applied to the active NBWP. In some implementations, for example, the UE 104, the RX processor 356, the TX processor 368, or the controller/processor 359 may execute the NBWP hopping component 140 or the communication component 146 to communicate on frequency domain resources for a frequency domain hop (e.g., hop 610a) indicated by the active NBWP hopping pattern 520 applied to the active NBWP 510. Accordingly, the UE 104, the RX processor 356, the TX processor 368, or the controller/processor 359 executing the NBWP hopping component 140 or the communication component 146 may provide means for communicating on frequency domain resources for a frequency domain hop indicated by the active NBWP hopping pattern applied to the active NBWP.

At block 1040, the method 1000 may optionally include receiving a signal to disable the active NBWP hopping pattern. In some implementations, for example, the UE 104, the RX processor 356, or the controller/processor 359 may execute the NBWP hopping component 140 or the deactivation component 148 to receive the disable command 760 to disable the active NBWP hopping pattern 520. In some implementations, at block 1050, the method 1000 may include setting the active NBWP 510 to a bandwidth of the frequency domain hop 610 indicated by the active NBWP hopping pattern 520 in response to the signal disabling the active NBWP hopping pattern. That is, the deactivation component 148 may stop any further hopping in response to the disable command 760. As another example, at block 1060, the method 1000 may optionally include setting the active NBWP to a default bandwidth in response to the signal disabling the active NBWP hopping pattern. That is, the deactivation component 148 may immediately hop to the default bandwidth and stop following the NBWP hopping pattern. In view of the foregoing, the UE 104, the RX processor 356, or the controller/processor 359 executing the NBWP hopping component 140 or the deactivation component 148 may provide means for receiving a signal to disable the active NBWP hopping pattern.

Figure 11:
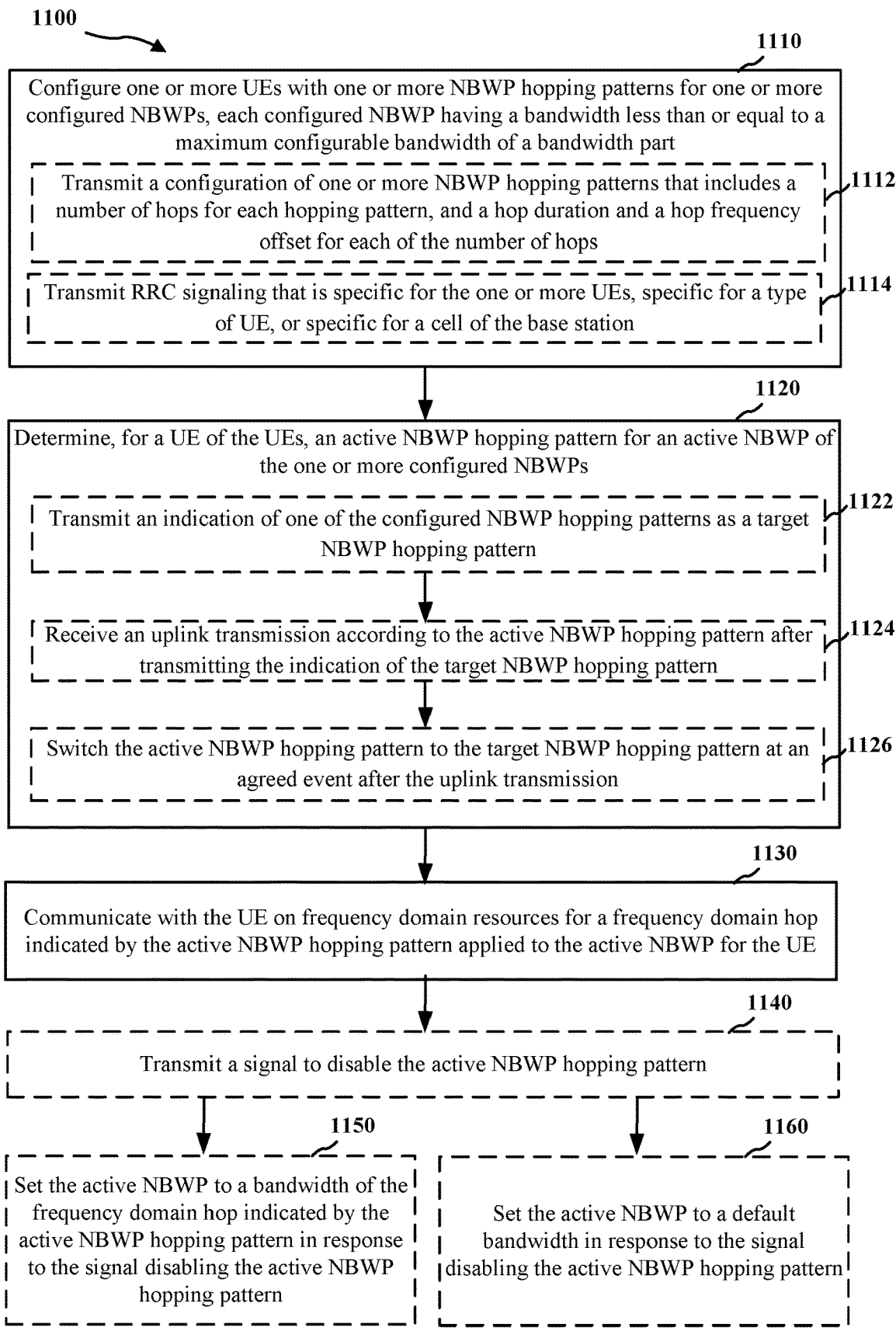
FIG. 11 is a flowchart of an example method for a BS to control NBWP hopping for a UE according to a hopping pattern.

FIG. 11 is a flowchart of an example method 1100 for a base station to control NBWP hopping for a UE 104 according to a NBWP hopping pattern. The method 1000 may be performed by a base station (such as the base station 102, which may include the memory 376 and which may be the entire base station 102 or a component of the base station 102 such as the NBWP control component 120, the TX processor 316, the RX processor 370, or the controller/processor 375). The method 1000 may be performed by the NBWP control component 120 in communication with the NBWP hopping component 140 of the UE 104.

At block 1010, the method 1000 may include configuring one or more UEs with one or more NBWP hopping patterns for one or more configured NBWPs, each configured NBWP having a bandwidth less than or equal to a maximum configurable bandwidth of a respective UE. In some implementations, for example, the base station 102, the TX processor 316, or the controller/processor 375 may execute the NBWP control component 120 or the configuration component 122 to configure one or more UEs 104 with one or more NBWP hopping patterns 520 for one or more configured NBWPs 510. In some implementations, at sub-block 1112, the block 1110 may include transmitting a configuration 530 of one or more NBWP hopping patterns 520 that includes a number of hops 532 for each hopping pattern 520, and a hop duration 534 and a hop frequency offset 536 for each of the number of hops. The configuration 530 may optionally include a duration of the gap 538 for each of the number of hops. In some implementations, at sub-block 1114, the block 1110 may include transmitting RRC signaling that is specific for the one or more UEs 104, specific for a type of UE, or specific for a cell of the base station 102. Accordingly, the base station 102, the TX processor 316, or the controller/processor 375 executing the NBWP control component 120 or the configuration component 122 may provide means for configuring one or more UEs with one or more NBWP hopping patterns for one or more configured NBWPs.

At block 1120, the method 1000 may include determining, for the respective UE, an active NBWP hopping pattern for an active NBWP of the one or more configured NBWPs. In some implementations, for example, base station 102, the TX processor 316, or the controller/processor 375 may execute the NBWP control component 120 or the activation component 124 to determine, for the UE 104, an active NBWP hopping pattern (e.g., NBWP hopping pattern 520a) for an active NBWP (e.g., NBWP 510a) of the one or more configured NBWPs 510. In some implementations, at sub-block 1122, the block 1120 may include transmitting an indication (e.g., enable command 735 or active NBWP hopping pattern indication 740) of one of the configured NBWP hopping patterns 520 as a target NBWP hopping pattern. In some implementations, at sub-block 1124, the block 1120 may include receiving an uplink transmission according to the active NBWP hopping pattern after transmitting the indication of the target NBWP hopping pattern. The uplink transmission may be an explicit or implicit acknowledgment of the indication. In some implementations, at sub-block 1126, the block 1120 may include switching the active NBWP hopping pattern to the target NBWP hopping pattern at an agreed event after the uplink transmission. For example, the agreed event may be an expiration of the switching delay 744, an expiration of a current hop, a completion of a NBWP hopping pattern, or an occurrence of an overlapping hop between the current active NBWP hopping pattern and the target NBWP hopping pattern. Accordingly, the base station 102, the TX processor 316, or the controller/processor 375 executing the NBWP control component 120 or the activation component 124 may provide means for determining, for a UE, an active NBWP hopping pattern for an active NBWP of the one or more configured NBWPs.

At block 1130, the method 1100 may include communicating with the UE on frequency domain resources for a frequency domain hop indicated by the active NBWP hopping pattern applied to the active NBWP for the UE. In some implementations, for example, the base station 102, the RX processor 370, or the controller/processor 375 may execute the NBWP control component 120 or the communication component 126 to communicate with the UE 104 on frequency domain resources for a frequency domain hop (e.g., hop 610a) indicated by the active NBWP hopping pattern 520 applied to the active NBWP 510. Accordingly, the base station 102, the RX processor 370, or the controller/processor 375 executing the NBWP control component 120 or the communication component 126 may provide means for communicating with the UE on frequency domain resources for a frequency domain hop indicated by the active NBWP hopping pattern applied to the active NBWP for the UE At block 1140, the method 1100 may optionally include transmitting a signal to disable the active NBWP hopping pattern. In some implementations, for example, base station 102, the TX processor 316, or the controller/processor 375 may execute the NBWP control component 120 or the activation component 124 to transmit the disable command 760 to disable the active NBWP hopping pattern 520. In some implementations, at block 1150, the method 1100 may include setting the active NBWP 510 to a bandwidth of the frequency domain hop 610 indicated by the active NBWP hopping pattern 520 in response to the signal disabling the active NBWP hopping pattern. That is, the activation component 126 may stop any further hopping in response to the disable command 760. As another example, at block 1160, the method 1100 may optionally include setting the active NBWP to a default bandwidth in response to the signal disabling the active NBWP hopping pattern. That is, the activation component 126 may immediately hop to the default bandwidth and stop following the NBWP hopping pattern. Accordingly, the base station 102, the TX processor 316, or the controller/processor 375 executing the NBWP control component 120 or the activation component 126 may provide means for transmitting a signal to disable the active NBWP hopping pattern.

SOME FURTHER EXAMPLE CLAUSES

Implementation examples are described in the following numbered clauses:

1. A method of wireless communication, comprising, at a user equipment (UE):
   receiving a configuration of one or more narrow bandwidth part (NBWP) hopping patterns for one or more configured NBWPs, each configured NBWP having a bandwidth less than or equal to a maximum configurable bandwidth of the UE;
   determining an active NBWP hopping pattern for an active NBWP of the one or more configured NBWPs; and
   communicating on frequency domain resources for a frequency domain hop indicated by the active NBWP hopping pattern applied to the active NBWP.

2. The method of clause 1, wherein the configuration of one or more NBWP hopping patterns includes a number of hops for each hopping pattern, and a hop duration and a hop frequency offset for each of the number of hops.

3. The method of clause 2, wherein the hop frequency offset is measured from one of: a carrier center frequency, a lowest resource element of the active NBWP, or a lowest physical resource block index of the active NBWP.

4. The method of clause 2 or 3, wherein the hop frequency offset is a multiple of a bandwidth of the active NBWP.

5. The method of any of clauses 1-4, wherein receiving the configuration of the one or more NBWP hopping patterns comprises receiving radio resource control (RRC) signaling that is specific for the UE, a type of UE, or a cell.

6. The method of any of clauses 1-5, wherein determining the active NBWP hopping pattern comprises receiving an indication of one of the configured NBWP hopping patterns as a target NBWP hopping pattern.

7. The method of clause 6, wherein the one or more NBWP hopping patterns is associated with a NBWP hopping pattern switching delay indicating a minimum time between receiving the indication of the target NBWP hopping pattern and communicating according to the target NBWP hopping pattern.

8. The method of clause 7, wherein the NBWP hopping pattern switching delay is based on: a relation between a source NBWP hopping pattern and the target NBWP hopping pattern, a type of the indication of the target NBWP hopping pattern, or a subcarrier spacing of the active NBWP, or a combination thereof.

9. The method of any of clauses 6-8, further comprising:
   transmitting an uplink transmission according to the active NBWP hopping pattern; and
   switching the active NBWP hopping pattern to the target NBWP hopping pattern at an agreed event after the uplink transmission.

10. The method of any of clauses 6-9, wherein the indication of the target NBWP hopping pattern is a downlink control information (DCI) indicating a communication outside of the active NBWP hopping pattern, further comprising switching to the target NBWP hopping pattern for the communication.

11. The method of any of clauses 6-10, wherein the target NBWP hopping pattern is a default hopping pattern including a single hop.

12. The method of any of clauses 1-5, further comprising receiving a signal to enable or disable the active NBWP hopping pattern.

13. The method of clause 12, further comprising setting the active NBWP to a bandwidth of the frequency domain hop indicated by the active NBWP hopping pattern in response to the signal disabling the active NBWP hopping pattern.

14. The method of clause 12, further comprising setting the active NBWP to a default bandwidth in response to the signal disabling the active NBWP hopping pattern.

15. A method of wireless communication, comprising, at a base station:
   configuring one or more user equipment (UEs) with one or more narrow bandwidth part (NBWP) hopping patterns for one or more configured NBWPs, each configured NBWP having a bandwidth less than or equal to a maximum configurable bandwidth of a respective UE;
   determining, for the respective UE, an active NBWP hopping pattern for an active NBWP of the one or more configured NBWPs; and
   communicating with the respective UE on frequency domain resources for a frequency domain hop indicated by the active NBWP hopping pattern applied to the active NBWP for the respective UE.

16. The method of clause 15, wherein configuring the one or more UEs comprises transmitting a configuration of one or more NBWP hopping patterns that includes a number of hops for each hopping pattern, and a hop duration and a hop frequency offset for each of the number of hops.

17. The method of clause 15 or 16, wherein configuring the one or more UEs with one or more narrow NBWP hopping patterns for the one or more configured NBWPs comprises transmitting radio resource control (RRC) signaling that is specific for the one or more UEs, specific for a type of UE, or specific for a cell of the base station.

18. The method of any of clauses 15-17, wherein determining the active NBWP hopping pattern for the active NBWP of the one or more configured NBWPs comprises transmitting an indication of one of the configured NBWP hopping patterns as a target NBWP hopping pattern.

19. The method of clause 18, wherein the one or more NBWP hopping patterns is associated with a NBWP hopping pattern switching delay indicating a minimum time between receiving the indication of the target NBWP hopping pattern at the respective UE and communicating according to the target NBWP hopping pattern.

20. The method of clause 19, wherein the NBWP hopping pattern switching delay is based on one of: a relation between a source NBWP hopping pattern and the target NBWP hopping pattern, a type of the indication of the target NBWP hopping pattern, or a subcarrier spacing of the active NBWP.

21. The method of any of clauses 18-20, wherein determining the active NBWP hopping pattern for the active NBWP of the one or more configured NBWPs comprises:
   receiving an uplink transmission according to the active NBWP hopping pattern after transmitting the indication of the target NBWP hopping pattern; and switching the active NBWP hopping pattern to the target NBWP hopping pattern at an agreed event after the uplink transmission.

22. The method of any of clauses 18-21, wherein the indication of the target NBWP hopping pattern is a downlink control information indicating a communication outside of the active NBWP hopping pattern, further comprising switching to the target NBWP hopping pattern for the communication.

23. The method of any of clauses 18-222, wherein the target NBWP hopping pattern is a default hopping pattern including a single hop.

24. The method of any of clauses 15-17, further comprising transmitting a signal to enable or disable the active NBWP hopping pattern.

25. The method of clause 24, further comprising setting the active NBWP to a bandwidth of the frequency domain hop indicated by the active NBWP hopping pattern in response to the signal disabling the active NBWP hopping pattern.

26. The method of clause 24, further comprising setting the active NBWP to a default bandwidth in response to the signal disabling the active NBWP hopping pattern.

27. An apparatus for wireless communication by a user equipment (UE), comprising:
a memory storing computer-executable instructions; and
at least one processor coupled to the memory and configured to execute the computer-executable instructions to:
receive a configuration of one or more narrow bandwidth part (NBWP) hopping patterns for one or more configured NBWPs, each configured NBWP having a bandwidth less than or equal to a maximum configurable bandwidth of the UE;
determine an active NBWP hopping pattern for an active NBWP of the one or more configured NBWPs; and
communicate on frequency domain resources for a frequency domain hop indicated by the active NBWP hopping pattern applied to the active NBWP.

28. The apparatus of clause 27, wherein the configuration of one or more NBWP hopping patterns includes a number of hops for each hopping pattern, and a hop duration and a hop frequency offset for each of the number of hops.

29. The apparatus of clause 28, wherein the hop frequency offset is measured from one of: a carrier center frequency, a lowest resource element of the active NBWP, or a lowest physical resource block index of the active NBWP.

30. The apparatus of clause 28 or 29, wherein the hop frequency offset is a multiple of a bandwidth of the active NBWP.

31. The apparatus of any of clauses 27-30, wherein to receive the configuration of the one or more NBWP hopping patterns, the at least one processor is configured to receive radio resource control (RRC) signaling that is specific for the UE, a type of UE, or a cell.

32. The apparatus of any of clauses 27-31, wherein to determine the active NBWP hopping pattern, the at least one processor is configured to receive an indication of one of the configured NBWP hopping patterns as a target NBWP hopping pattern.

33. The apparatus of clause 32, wherein the one or more NBWP hopping patterns is associated with a NBWP hopping pattern switching delay indicating a minimum time between receiving the indication of the target NBWP hopping pattern and communicating according to the target NBWP hopping pattern.

34. The apparatus of clause 33, wherein the NBWP hopping pattern switching delay is based on: a relation between a source NBWP hopping pattern and the target NBWP hopping pattern, a type of the indication of the target NBWP hopping pattern, or a subcarrier spacing of the active NBWP, or a combination thereof.

35. The apparatus of any of clauses 32-34, wherein the at least one processor is configured to:
transmit an uplink transmission according to the active NBWP hopping pattern; and
switch the active NBWP hopping pattern to the target NBWP hopping pattern at an agreed event after the uplink transmission.

36. The apparatus of any of clauses 32-35, wherein the indication of the target NBWP hopping pattern is a downlink control information (DCI) indicating a communication outside of the active NBWP hopping pattern, wherein the at least one processor is configured to switch to the target NBWP hopping pattern for the communication.

37. The apparatus of any of clauses 32-36, wherein the target NBWP hopping pattern is a default hopping pattern including a single hop.

38. The apparatus of any of clause 27-31, wherein the at least one processor is configured to receive a signal to enable or disable the active NBWP hopping pattern.

39. The apparatus of clause 38, wherein the at least one processor is configured to set the active NBWP to a bandwidth of the frequency domain hop indicated by the active NBWP hopping pattern in response to the signal disabling the active NBWP hopping pattern.

40. The apparatus of clause 38, wherein the at least one processor is configured to set the active NBWP to a default bandwidth in response to the signal disabling the active NBWP hopping pattern.

41. An apparatus for wireless communication by a base station, comprising:
a memory storing computer-executable instructions; and
at least one processor coupled to the memory and configured to execute the computer-executable instructions to:
configure one or more user equipment (UEs) with one or more narrow bandwidth part (NBWP) hopping patterns for one or more configured NBWPs, each configured NBWP having a bandwidth less than or equal to a maximum configurable bandwidth of a respective UE;
determine, for the respective UE, an active NBWP hopping pattern for an active NBWP of the one or more configured NBWPs; and
communicate with the respective UE on frequency domain resources for a frequency domain hop indicated by the active NBWP hopping pattern applied to the active NBWP for the respective UE.

42. The apparatus of clause 41, wherein the at least one processor is configured to transmit a configuration of one or more NBWP hopping patterns that includes a number of hops for each hopping pattern, and a hop duration and a hop frequency offset for each of the number of hops.

43. The apparatus of clause 41 or 42, wherein to configuring the one or more UEs with one or more narrow NBWP hopping patterns for the one or more configured NBWPs, the at least one processor is configured to transmit radio resource control (RRC) signaling that is specific for the one or more UEs, specific for a type of UE, or specific for a cell of the base station.

44. The apparatus of any of clauses 41-43, wherein the at least one processor is configured to transmit an indication of one of the configured NBWP hopping patterns as a target NBWP hopping pattern.

45. The apparatus of clause 44, wherein the one or more NBWP hopping patterns is associated with a NBWP hopping pattern switching delay indicating a minimum time between receiving the indication of the target NBWP hopping pattern at the respective UE and communicating according to the target NBWP hopping pattern.

46. The apparatus of clause 45, wherein the NBWP hopping pattern switching delay is based on one of: a relation between a source NBWP hopping pattern and the target NBWP hopping pattern, a type of the indication of the target NBWP hopping pattern, or a subcarrier spacing of the active NBWP.

47. The apparatus of any of clauses 44-46, wherein the at least one processor is configured to:
  receive an uplink transmission according to the active NBWP hopping pattern after transmitting the indication of the target NBWP hopping pattern; and
  switch the active NBWP hopping pattern to the target NBWP hopping pattern at an agreed event after the uplink transmission.

48. The apparatus of any of clauses 44-47, wherein the indication of the target NBWP hopping pattern is a downlink control information indicating a communication outside of the active NBWP hopping pattern, wherein the at least one processor is configured to switch to the target NBWP hopping pattern for the communication.

49. The apparatus of any of clauses 44-48, wherein the target NBWP hopping pattern is a default hopping pattern including a single hop.

50. The apparatus of any of clauses 41-43, wherein the at least one processor is configured to transmit a signal to enable or disable the active NBWP hopping pattern.

51. The apparatus of clause 50, wherein the at least one processor is configured to set the active NBWP to a bandwidth of the frequency domain hop indicated by the active NBWP hopping pattern in response to the signal disabling the active NBWP hopping pattern.

52. The apparatus of clause 50, wherein the at least one processor is configured to set the active NBWP to a default bandwidth in response to the signal disabling the active NBWP hopping pattern.

53. An apparatus for wireless communication at a user equipment (UE), comprising:
  means for receiving a configuration of one or more narrow bandwidth part (NBWP) hopping patterns for one or more configured NBWPs, each configured NBWP having a bandwidth less than or equal to a maximum configurable bandwidth of the UE;
  means for determining an active NBWP hopping pattern for an active NBWP of the one or more configured NBWPs; and
  means for communicating on frequency domain resources for a frequency domain hop indicated by the active NBWP hopping pattern applied to the active NBWP.

54. The apparatus of clause 53, wherein the configuration of one or more NBWP hopping patterns includes a number of hops for each hopping pattern, and a hop duration and a hop frequency offset for each of the number of hops.

55. The apparatus of clause 54, wherein the hop frequency offset is measured from one of: a carrier center frequency, a lowest resource element of the active NBWP, or a lowest physical resource block index of the active NBWP.

56. The apparatus of clause 54 or 55, wherein the hop frequency offset is a multiple of a bandwidth of the active NBWP.

57. The apparatus of any of clauses 53-56, wherein the means for receiving the configuration of the one or more NBWP hopping patterns is configured to receive radio resource control (RRC) signaling that is specific for the UE, a type of UE, or a cell.

58. The apparatus of any of clauses 53-57, wherein the means for determining the active NBWP hopping pattern is configured to receive an indication of one of the configured NBWP hopping patterns as a target NBWP hopping pattern.

59. The apparatus of clause 58, wherein the one or more NBWP hopping patterns is associated with a NBWP hopping pattern switching delay indicating a minimum time between receiving the indication of the target NBWP hopping pattern and communicating according to the target NBWP hopping pattern.

60. The apparatus of clause 59, wherein the NBWP hopping pattern switching delay is based on: a relation between a source NBWP hopping pattern and the target NBWP hopping pattern, a type of the indication of the target NBWP hopping pattern, or a subcarrier spacing of the active NBWP, or a combination thereof.

61. The apparatus of any of clauses 58-60, wherein the means for communicating is configured to:
  transmit an uplink transmission according to the active NBWP hopping pattern; and
  switch the active NBWP hopping pattern to the target NBWP hopping pattern at an agreed event after the uplink transmission.

62. The apparatus of any of clauses 58-61, wherein the indication of the target NBWP hopping pattern is a downlink control information (DCI) indicating a communication outside of the active NBWP hopping pattern, wherein the means for communicating is configured to switch to the target NBWP hopping pattern for the communication.

63. The apparatus of any of clauses 58-61, wherein the target NBWP hopping pattern is a default hopping pattern including a single hop.

64. The apparatus of any of clauses 53-57, further comprising means for disabling the active NBWP hopping pattern.

65. The apparatus of clause 64, wherein the means for disabling the active NBWP hopping pattern is configured to set the active NBWP to a bandwidth of the frequency domain hop indicated by the active NBWP hopping pattern in response to the signal disabling the active NBWP hopping pattern.

66. The apparatus of clause 64, wherein the means for disabling the active NBWP hopping pattern is configured to set the active NBWP to a default bandwidth in response to the signal disabling the active NBWP hopping pattern.

67. An apparatus for wireless communication at a base station, comprising:
  means for configuring one or more user equipment (UEs) with one or more narrow bandwidth part (NBWP) hopping patterns for one or more configured NBWPs, each configured NBWP having a bandwidth less than or equal to a maximum configurable bandwidth of a respective UE;
  means for determining, for the respective UE, an active NBWP hopping pattern for an active NBWP of the one or more configured NBWPs; and
  means for communicating with the respective UE on frequency domain resources for a frequency domain hop indicated by the active NBWP hopping pattern applied to the active NBWP for the respective UE.

68. The apparatus of clause 67, wherein the means for configuring the one or more UEs is configured to transmit a configuration of one or more NBWP hopping patterns that includes a number of hops for each hopping pattern, and a hop duration and a hop frequency offset for each of the number of hops.

69. The apparatus of clause 67 or 68, wherein the means for configuring the one or more UEs with one or more narrow NBWP hopping patterns for the one or more configured NBWPs is configured to transmit radio resource control (RRC) signaling that is specific for the one or more UEs, specific for a type of UE, or specific for a cell of the base station.

70. The apparatus of any of clauses 67-69, wherein the means for determining the active NBWP hopping pattern for the active NBWP of the one or more configured NBWPs is configured to transmit an indication of one of the configured NBWP hopping patterns as a target NBWP hopping pattern.

71. The apparatus of clause 70, wherein the one or more NBWP hopping patterns is associated with a NBWP hopping pattern switching delay indicating a minimum time between receiving the indication of the target NBWP hopping pattern at the respective UE and communicating according to the target NBWP hopping pattern.

72. The apparatus of clause 71, wherein the NBWP hopping pattern switching delay is based on one of: a relation between a source NBWP hopping pattern and the target NBWP hopping pattern, a type of the indication of the target NBWP hopping pattern, or a subcarrier spacing of the active NBWP.

73. The apparatus of any of clauses 70-72, wherein the means for determining the active NBWP hopping pattern for the active NBWP of the one or more configured NBWPs is configured to:
  receive an uplink transmission according to the active NBWP hopping pattern after transmitting the indication of the target NBWP hopping pattern; and
  switch the active NBWP hopping pattern to the target NBWP hopping pattern at an agreed event after the uplink transmission.

74. The apparatus of any of clauses 70-73, wherein the indication of the target NBWP hopping pattern is a downlink control information indicating a communication outside of the active NBWP hopping pattern, wherein the means for communication is configured to switch to the target NBWP hopping pattern for the communication.

75. The apparatus of any of clauses 70-74, wherein the target NBWP hopping pattern is a default hopping pattern including a single hop.

76. The apparatus of any of clauses 67-69, further comprising means for transmitting a signal to disable the active NBWP hopping pattern.

77. The apparatus of clause 76, wherein the means for transmitting a signal to disable the active NBWP hopping pattern is configured to set the active NBWP to a bandwidth of the frequency domain hop indicated by the active NBWP hopping pattern in response to the signal disabling the active NBWP hopping pattern.

78. The apparatus of clause 76, wherein the means for transmitting a signal to disable the active NBWP hopping pattern is configured to set the active NBWP to a default bandwidth in response to the signal disabling the active NBWP hopping pattern.

79. A non-transitory computer-readable medium storing computer-executable instructions that when executed by a processor of a user equipment (UE), cause the processor to:
  receive a configuration of one or more narrow bandwidth part (NBWP) hopping patterns for one or more configured NBWPs, each configured NBWP having a bandwidth less than or equal to a maximum configurable bandwidth of the UE;
  determine an active NBWP hopping pattern for an active NBWP of the one or more configured NBWPs; and
  communicate on frequency domain resources for a frequency domain hop indicated by the active NBWP hopping pattern applied to the active NBWP.

80. The non-transitory computer-readable medium of clause 79, wherein the configuration of one or more NBWP hopping patterns includes a number of hops for each hopping pattern, and a hop duration and a hop frequency offset for each of the number of hops.

81. The non-transitory computer-readable medium of clause 80, wherein the hop frequency offset is measured from one of: a carrier center frequency, a lowest resource element of the active NBWP, or a lowest physical resource block index of the active NBWP.

82. The non-transitory computer-readable medium of clause 80 or 81, wherein the hop frequency offset is a multiple of a bandwidth of the active NBWP.

83. The non-transitory computer-readable medium of any of clauses 79-82, wherein the code to receive the configuration of the one or more NBWP hopping patterns comprises code to receive radio resource control (RRC) signaling that is specific for the UE, a type of UE, or a cell.

84. The non-transitory computer-readable medium of any of clauses 79-83, wherein the code to determine the active NBWP hopping pattern comprises code to receive an indication of one of the configured NBWP hopping patterns as a target NBWP hopping pattern.

85. The non-transitory computer-readable medium of clause 84, wherein the one or more NBWP hopping patterns is associated with a NBWP hopping pattern switching delay indicating a minimum time between receiving the indication of the target NBWP hopping pattern and communicating according to the target NBWP hopping pattern.

86. The non-transitory computer-readable medium of clause 85, wherein the NBWP hopping pattern switching delay is based on: a relation between a source NBWP hopping pattern and the target NBWP hopping pattern, a type of the indication of the target NBWP hopping pattern, or a subcarrier spacing of the active NBWP, or a combination thereof.

87. The non-transitory computer-readable medium of any of clauses 84-86, further comprising code to:
  transmit an uplink transmission according to the active NBWP hopping pattern; and
  switch the active NBWP hopping pattern to the target NBWP hopping pattern at an agreed event after the uplink transmission.

88. The non-transitory computer-readable medium of any of clauses 84-87, wherein the indication of the target NBWP hopping pattern is a downlink control information (DCI) indicating a communication outside of the active NBWP hopping pattern, further comprising code to switch to the target NBWP hopping pattern for the communication.

89. The non-transitory computer-readable medium of any of clauses 84-88, wherein the target NBWP hopping pattern is a default hopping pattern including a single hop.

90. The non-transitory computer-readable medium of any of clauses 79-83, further comprising code to receive a signal to enable or disable the active NBWP hopping pattern.

91. The non-transitory computer-readable medium of clause 90, further comprising code to set the active NBWP to a bandwidth of the frequency domain hop indicated by the active NBWP hopping pattern in response to the signal disabling the active NBWP hopping pattern.

92. The non-transitory computer-readable medium of clause 90, further comprising code to set the active NBWP to a default bandwidth in response to the signal disabling the active NBWP hopping pattern.

93. A non-transitory computer-readable medium storing computer-executable instructions that when executed by a processor of a base station, cause the processor to:
configure one or more user equipment (UEs) with one or more narrow bandwidth part (NBWP) hopping patterns for one or more configured NBWPs, each configured NBWP having a bandwidth less than or equal to a maximum configurable bandwidth of a respective UE;
determine, for the respective UE, an active NBWP hopping pattern for an active NBWP of the one or more configured NBWPs; and
communicate with the respective UE on frequency domain resources for a frequency domain hop indicated by the active NBWP hopping pattern applied to the active NBWP for the respective UE.

94. The non-transitory computer-readable medium of clause 93, wherein the code to configure the one or more UEs comprises code to transmit a configuration of one or more NBWP hopping patterns that includes a number of hops for each hopping pattern, and a hop duration and a hop frequency offset for each of the number of hops.

95. The non-transitory computer-readable medium of clause 93 or 94, wherein the code to configure the one or more UEs with one or more narrow NBWP hopping patterns for the one or more configured NBWPs comprises code to transmit radio resource control (RRC) signaling that is specific for the one or more UEs, specific for a type of UE, or specific for a cell of the base station.

96. The non-transitory computer-readable medium of any of clauses 93-95, wherein the code to determine the active NBWP hopping pattern for the active NBWP of the one or more configured NBWPs comprises code to transmit an indication of one of the configured NBWP hopping patterns as a target NBWP hopping pattern.

97. The non-transitory computer-readable medium of clause 96, wherein the one or more NBWP hopping patterns is associated with a NBWP hopping pattern switching delay indicating a minimum time between receiving the indication of the target NBWP hopping pattern at the respective UE and communicating according to the target NBWP hopping pattern.

98. The non-transitory computer-readable medium of clause 97, wherein the NBWP hopping pattern switching delay is based on one of: a relation between a source NBWP hopping pattern and the target NBWP hopping pattern, a type of the indication of the target NBWP hopping pattern, or a subcarrier spacing of the active NBWP.

99. The non-transitory computer-readable medium of any of clauses 96-98, wherein the code to determine the active NBWP hopping pattern for the active NBWP of the one or more configured NBWPs comprises code to:
receive an uplink transmission according to the active NBWP hopping pattern after transmitting the indication of the target NBWP hopping pattern; and
switch the active NBWP hopping pattern to the target NBWP hopping pattern at an agreed event after the uplink transmission.

100. The non-transitory computer-readable medium of any of clauses 96-99, wherein the indication of the target NBWP hopping pattern is a downlink control information indicating a communication outside of the active NBWP hopping pattern, further comprising code to switch to the target NBWP hopping pattern for the communication.

101. The non-transitory computer-readable medium of any of clauses 96-100, wherein the target NBWP hopping pattern is a default hopping pattern including a single hop.

102. The non-transitory computer-readable medium of any of clauses 93-95, further comprising code to transmit a signal to enable or disable the active NBWP hopping pattern.

103. The non-transitory computer-readable medium of clause 102, further comprising code to set the active NBWP to a bandwidth of the frequency domain hop indicated by the active NBWP hopping pattern in response to the signal disabling the active NBWP hopping pattern.

104. The non-transitory computer-readable medium of clause 102, further comprising code to set the active NBWP to a default bandwidth in response to the signal disabling the active NBWP hopping pattern.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising, at a user equipment (UE):
    receiving a configuration of one or more respective narrow bandwidth part (NBWP) hopping patterns for each of a plurality of configured NBWPs, each configured NBWP having a bandwidth less than or equal to a maximum configurable bandwidth of the UE, wherein the configuration of the one or more respective NBWP hopping patterns includes a number of hops for each hopping pattern, and a respective hop duration and a respective hop frequency offset for each of the number of hops, wherein the respective hop frequency offset for at least one hop is larger than a bandwidth of a corresponding configured NBWP;
    determining an active NBWP hopping pattern of the one or more respective NBWP hopping patterns corresponding to an active NBWP of the one or more configured NBWPs having a nominal NBWP configuration; and
    communicating on frequency domain resources for each of a plurality of frequency domain hops indicated by the active NBWP hopping pattern applied to the nominal NBWP configuration of the active NBWP, wherein the nominal NBWP configuration is maintained for each of the plurality of frequency domain hops.

2. The method of claim 1, wherein the respective hop frequency offset is measured from one of: a carrier center frequency, a lowest resource element of the active NBWP, or a lowest physical resource block index of the active NBWP.

3. The method of claim 1, wherein the respective hop frequency offset is a multiple of a bandwidth of the active NBWP.

4. The method of claim 1, wherein receiving the configuration of the one or more NBWP hopping patterns comprises receiving radio resource control (RRC) signaling that is specific for the UE, a type of UE, or a cell.

5. The method of claim 1, wherein determining the active NBWP hopping pattern comprises receiving an indication of one of the configured NBWP hopping patterns as a target NBWP hopping pattern.

6. The method of claim 5, wherein the one or more NBWP hopping patterns is associated with a NBWP hopping pattern switching delay indicating a minimum time between receiving the indication of the target NBWP hopping pattern and communicating according to the target NBWP hopping pattern.

7. The method of claim 6, wherein the NBWP hopping pattern switching delay is based on: a relation between a source NBWP hopping pattern and the target NBWP hopping pattern, a type of the indication of the target NBWP hopping pattern, or a subcarrier spacing of the active NBWP, or a combination thereof.

8. The method of claim 5, further comprising:
transmitting an uplink transmission according to the active NBWP hopping pattern; and
switching the active NBWP hopping pattern to the target NBWP hopping pattern at an agreed event after the uplink transmission.

9. The method of claim 5, wherein the indication of the target NBWP hopping pattern is a downlink control information (DCI) indicating a communication outside of the active NBWP hopping pattern, further comprising switching to the target NBWP hopping pattern for the communication.

10. The method of claim 5, wherein the target NBWP hopping pattern is a default hopping pattern including a single hop.

11. The method of claim 1, further comprising receiving a signal to enable or disable the active NBWP hopping pattern.

12. The method of claim 11, further comprising setting the active NBWP to a bandwidth of the frequency domain hop indicated by the active NBWP hopping pattern in response to the signal disabling the active NBWP hopping pattern.

13. The method of claim 11, further comprising setting the active NBWP to a default bandwidth in response to the signal disabling the active NBWP hopping pattern.

14. A method of wireless communication, comprising, at a base station:
configuring one or more user equipment (UEs) with one or more respective narrow bandwidth part (NBWP) hopping patterns for each of a plurality of configured NBWPs, each configured NBWP having a bandwidth less than or equal to a maximum configurable bandwidth of a respective UE, wherein configuring the one or more UEs comprises transmitting a configuration of the one or more respective NBWP hopping patterns that includes a number of hops for each hopping pattern, and a respective hop duration and a respective hop frequency offset for each of the number of hops, wherein the respective hop frequency offset for at least one hop is larger than a bandwidth of an active NBWP for the respective UE;
determining, for the respective UE, an active NBWP hopping pattern of the one or more respective NBWP hopping patterns corresponding to the active NBWP of the one or more configured NBWPs having a nominal NBWP configuration; and
communicating with the respective UE on frequency domain resources for of a plurality of frequency domain hop indicated by the active NBWP hopping pattern applied to the nominal NBWP configuration of the active NBWP for the respective UE, wherein the nominal NBWP configuration is maintained for each of the plurality of frequency doman hops.

15. The method of claim 14, wherein configuring the one or more UEs with one or more narrow NBWP hopping patterns for the one or more configured NBWPs comprises transmitting radio resource control (RRC) signaling that is specific for the one or more UEs, specific for a type of UE, or specific for a cell of the base station.

16. The method of claim 14, wherein determining the active NBWP hopping pattern corresponding to the active NBWP of the one or more configured NBWPs comprises transmitting an indication of one of the configured NBWP hopping patterns as a target NBWP hopping pattern.

17. The method of claim 16, wherein the one or more NBWP hopping patterns is associated with a NBWP hopping pattern switching delay indicating a minimum time between receiving the indication of the target NBWP hopping pattern at the respective UE and communicating according to the target NBWP hopping pattern.

18. The method of claim 17, wherein the NBWP hopping pattern switching delay is based on one of: a relation between a source NBWP hopping pattern and the target NBWP hopping pattern, a type of the indication of the target NBWP hopping pattern, or a subcarrier spacing of the active NBWP.

19. The method of claim 16, wherein determining the active NBWP hopping pattern for the active NBWP of the one or more configured NBWPs comprises:
receiving an uplink transmission according to the active NBWP hopping pattern after transmitting the indication of the target NBWP hopping pattern; and
switching the active NBWP hopping pattern to the target NBWP hopping pattern at an agreed event after the uplink transmission.

20. The method of claim 16, wherein the indication of the target NBWP hopping pattern is a downlink control information indicating a communication outside of the active NBWP hopping pattern, further comprising switching to the target NBWP hopping pattern for the communication.

21. The method of claim 16, wherein the target NBWP hopping pattern is a default hopping pattern including a single hop.

22. The method of claim 14, further comprising transmitting a signal to enable or disable the active NBWP hopping pattern.

23. The method of claim 22, further comprising setting the active NBWP to a bandwidth of the frequency domain hop indicated by the active NBWP hopping pattern in response to the signal disabling the active NBWP hopping pattern.

24. The method of claim 22, further comprising setting the active NBWP to a default bandwidth in response to the signal disabling the active NBWP hopping pattern.

25. An apparatus for wireless communication by a user equipment (UE), comprising:
one or memories, individually or in combination, storing computer-executable instructions; and
one or more processors coupled to the one or more memories and configured to, individually or in combination, execute the computer-executable instructions to:
receive a configuration of one or more respective narrow bandwidth part (NBWP) hopping patterns for a plurality of configured NBWPs, each configured NBWP having a bandwidth less than or equal to a maximum configurable bandwidth of the UE, wherein the configuration of the one or more respective NBWP hopping patterns includes a number of hops for each hopping pattern, and a respective hop duration and a respective hop frequency offset for each of the number of hops, wherein the respective hop frequency offset for at least one hop is larger than a bandwidth of a corresponding configured NBWP;
determine an active NBWP hopping pattern of the one or more respective NBWP hopping patterns corresponding to an active NBWP of the one or more configured NBWPs having a nominal NBWP configuration; and
communicate on frequency domain resources for a frequency domain hop indicated by the active NBWP hopping pattern applied to the nominal NBWP configuration of the active NBWP, wherein the nominal NBWP configuration is maintained for each of the plurality of frequency domain hops.

26. The apparatus of claim 25, wherein the one or more processors, individually or in combination, are configured to receive an indication of one of the configured NBWP hopping patterns as a target NBWP hopping pattern.

27. An apparatus for wireless communication by a base station, comprising:
- one or more memories, individually or in combination, storing computer-executable instructions; and
- one or more processors coupled to the one or more memories and configured to configured to, individually or in combination, execute the computer-executable instructions to:
  - configure one or more user equipment (UEs) with one or more respective narrow bandwidth part (NBWP) hopping patterns for each of a plurality of configured NBWPs, each configured NBWP having a bandwidth less than or equal to a maximum configurable bandwidth of a respective UE by transmitting a configuration of the one or more respective NBWP hopping patterns that includes a number of hops for each hopping pattern, and a respective hop duration and a respective hop frequency offset for each of the number of hops, wherein the respective hop frequency offset for at least one hop is larger than a bandwidth of an active NBWP for the respective UE;
  - determine, for the respective UE, an active NBWP hopping pattern of the one or more respective NBWP hopping patterns corresponding to the an active NBWP of the one or more configured NBWPs having a nominal confugration; and
  - communicate with the respective UE on frequency domain resources for each of a plurality of frequency domain hop indicated by the active NBWP hopping pattern applied to the nominal NBWP configuration of the active NBWP, wherein the nominal NBWP configuration is maintained for each of the plurality of frequency domain hops.

* * * * *